US012599909B2

(12) United States Patent
Chiu et al.

(10) Patent No.: US 12,599,909 B2
(45) Date of Patent: Apr. 14, 2026

(54) TUBE TRAY FOR SECONDARY TUBES, SECONDARY TUBE HANDLING MODULE, AND METHOD OF HANDLING SECONDARY TUBES IN AN AUTOMATED PROCESSING SYSTEM

(71) Applicant: Roche Molecular Systems, Inc., Pleasanton, CA (US)

(72) Inventors: Lawrence Chiu, Orinda, CA (US); Reiner Hitt, Sursee (CH); Raphael Haag, Rain (CH); Erich Caflisch, Bonaduz (CH); Nicolas Lehner, Wil (CH)

(73) Assignee: Roche Molecular Systems, Inc., Pleasanton, CA (US)

( * ) Notice: Subject to any disclaimer, the term of this patent is extended or adjusted under 35 U.S.C. 154(b) by 71 days.

(21) Appl. No.: 18/827,465

(22) Filed: Sep. 6, 2024

(65) Prior Publication Data

US 2024/0424499 A1      Dec. 26, 2024

Related U.S. Application Data

(63) Continuation of application No. 16/963,800, filed as application No. PCT/EP2019/051513 on Jan. 22, 2019, now Pat. No. 12,109,568.

(30) Foreign Application Priority Data

Jan. 23, 2018      (EP) ..................................... 18153040

(51) Int. Cl.
| | |
|---|---|
| *B01L 9/06* | (2006.01) |
| *B65C 9/02* | (2006.01) |
| *G01N 35/04* | (2006.01) |

(52) U.S. Cl.
CPC .................. *B01L 9/06* (2013.01); *B65C 9/02* (2013.01); *G01N 35/04* (2013.01); *G01N 2035/0406* (2013.01)

(58) Field of Classification Search
CPC .. B01L 9/06; B65C 9/02; G01N 35/04; G01N 2035/0406; G01N 2035/1032
See application file for complete search history.

(56) References Cited

U.S. PATENT DOCUMENTS

| | | | |
|---|---|---|---|
| 9,474,691 B2 | 10/2016 | Yuyama et al. | |
| 9,598,197 B2 * | 3/2017 | Sato .......................... | B65C 9/30 |
| 2005/0178726 A1 | 8/2005 | Belly | |

(Continued)

FOREIGN PATENT DOCUMENTS

| | | |
|---|---|---|
| BR | PI0500597 A | 5/2006 |
| CN | 101849187 A | 9/2010 |

(Continued)

*Primary Examiner* — John McGuirk
(74) *Attorney, Agent, or Firm* — Roche Molecular Systems, Inc.

(57)      ABSTRACT

The present invention describes a secondary tube tray for use in an automated processing system, the tray comprising a base module and a secondary tube insert. Furthermore, the present invention describes a secondary tube handling module of an automated processing system for automatically processing biological sample, and a method of handling secondary tubes for use in automatically processing biological sample in an automated processing system.

10 Claims, 9 Drawing Sheets

(56)         References Cited

U.S. PATENT DOCUMENTS

2008/0025878 A1     1/2008  Schacher et al.
2011/0002760 A1 *  1/2011  Pedrazzini ......... B65G 47/1471
                                                      414/222.07

FOREIGN PATENT DOCUMENTS

CN           104609049 A      5/2015
CN           106053148 A     10/2016
JP            H0776330 A   *  3/1995
WO          WO-9907627 A1 *  2/1999   ............ B65B 9/023

* cited by examiner

TUBE TRAY FOR SECONDARY TUBES, SECONDARY TUBE HANDLING MODULE, AND METHOD OF HANDLING SECONDARY TUBES IN AN AUTOMATED PROCESSING SYSTEM

CROSS-REFERENCES TO RELATED APPLICATIONS

This application is a continuation of U.S. application Ser. No. 16/963,800, filed Jul. 21, 2020, which is a national stage application, filed under 35 U.S.C. § 371, of International Patent Application No. PCT/EP2019/051513, filed Jan. 22, 2019, which claims the benefit and priority of European Patent Application No. 18153040.3, filed Jan. 23, 2018, each of which applications are incorporated herein by reference

TECHNICAL FIELD

The present invention relates generally to the technical field of handling tubes, in particular secondary tubes, in connection with or by means of an automated processing system for automatically processing biological sample, for example for performing medical diagnostic analysis of biological samples.

In more detail, the present invention relates to a tube tray for secondary tubes, also referred to as secondary tube tray, the tray comprising a base module and a secondary tube insert, which base module receives the secondary tube insert and forms the secondary tube tray together with the secondary tube insert, resulting in a secondary tube tray including a secondary tube insert. The secondary tube insert is particularly used for holding a plurality of secondary tubes inside the tray, the secondary tubes being a particular kind of sample tubes for use in an automated processing system, such as an analytical, pre-analytical or post-analytical processing system in a laboratory environment. Furthermore, the present invention also relates to a secondary tube handling module, for example as part of an automated processing system, for handling secondary tubes contained by the secondary tube tray. Moreover, the present invention also relates to a method of handling such secondary tubes discharged from the secondary tube tray, for use in automatically processing biological sample in an automated processing system.

In the present technical field, the term "sample tube" or "sample container" generally refers to any individual container for transporting, storing and/or processing a sample. In particular, the term without limitation refers to a piece of laboratory glass- or plastic-ware optionally comprising a cap on its upper end. Accordingly, such a sample tube, often also referred in a simplified manner as "tube", can be a sample collection test tube, also called "primary tube", which sample collection test tube can be used to receive a sample such as a biological sample from a patient, and to transport the sample contained therein to an analytical laboratory for diagnostics purposes. Such samples are routinely taken from patients by medical personnel in hospitals or in private practice, for laboratory analysis, e.g. for determining concentration levels of different components within the taken samples. Here, the terms "sample" and "biological sample" usually refer to material(s) that may potentially contain an analyte of interest. The sample can be derived from any biological source, such as a physiological fluid, including blood, saliva, ocular lens fluid, cerebrospinal fluid, sweat, urine, stool, semen, milk, ascites fluid, mucous, synovial fluid, peritoneal fluid, amniotic fluid, tissue, cultured cells, or the like, wherein the sample can be suspected to contain a certain antigen or nucleic acid. The patient sample can be pretreated prior to use, such as when preparing plasma from blood, diluting viscous fluids, lysis or the like. Methods of treatment can involve filtration, distillation, concentration, inactivation of interfering components, and the addition of reagents. A sample may be used directly as obtained from the source, or may be used following a pretreatment of the sample to modify the character of the sample, for example when rendering an initially solid or semi-solid biological material to become liquid by dissolving or suspending it with a suitable liquid medium.

Besides the above explained general understanding of the term "sample tube", a sample tube can also be a so-called "secondary tube", which may be used to receive an aliquot of sample from a primary tube, for example before or during the laboratory analysis procedure for in-vitro diagnostic use. In more detail, secondary tubes are usually used as a secondary container for aliquoting, storing and transporting biological samples such as human tissue, blood, saliva or urine, from a sample in a primary tube in the clinical laboratory and for the analysis in laboratory analyzers, which samples are routinely taken from patients by medical personnel in hospitals or in private practice, for laboratory analysis, e.g. for determining concentration levels of different components within the taken samples. Secondary tubes, which usually exhibit an elongated tube shape with one open end and which are normally intended for single use only, can typically be made of plastics and may have a low degree of variation of size and type compared to primary tubes, meaning that such secondary tubes are usually similar or identical to each other. If necessary, secondary tubes can be closed by a respective safety cap which is often screwed onto the open end of the secondary tube to be closed after aliquoting.

BACKGROUND

As mentioned above, particularly when employed within an automated processing system for automatically processing biological sample, secondary tubes are usually used for aliquoting, storing and transporting biological samples, wherein the secondary tubes destined to receive sample aliquots should be labeled accordingly in order to be clearly identifiable, for example by means of barcode labeling or the like, which labeling can be handled by an automated device, such as a robotic system or the like.

As an example of a device for dispensing and labeling sample tubes, U.S. Pat. No. 9,598,197 B2 discloses a portable double-decker desktop tube dispenser, wherein a blood sampling tube stacker device is arranged in an overlapping manner above a printing-and-pasting device, such that primary tubes for blood sampling are dispensed from a tube stocker and transported to a label printing-and-pasting device positioned below the tube stockers by means of a conveying belt. Here, the sample tubes can be provided inside the tube stocker in random horizontal orientation, since a cap side of each primary tube can be detected and a direction of printing the respective label can be chosen in this respect, in order to be able to paste the labels in a proper orientation onto the primary tubes.

However, such portable desktop solutions are not suitable for an automated processing system due to the fact that automated processing systems are usually self-contained closed systems which require loading/unloading slots as interfaces between the interior and the exterior of such self-contained system, in order for an operator to be able to introduce primary tubes, reagent containers, and/or in particular secondary tubes into the interior of the automated processing system. Accordingly, a portable desktop solution as described above is not suitable for interchangeable introduction into an automated processing system due to the necessity of disturbing the closure of the automated processing system. For this purpose, and as basis for the present invention, tubes to be introduced into the automated processing system can be stored in respective trays, which are employed as smallest transport unit and are designed to fit into the loading/unloading slots of the automated processing system. By means of interchangeable introduction of such trays, the automated processing system can remain self-contained, since the trays loaded into and unloaded from the loading/unloading slots of the automated processing system do not disturb the closure of the system, for example by means of a lock-gate system or the like provided in combination with the loading/unloading slots. However, it has been found that, inside the automated processing system, the discharging and further processing of secondary tubes from such trays has still not been implemented in an effective and sufficient way. Thus, the general need exists in the present technical field to provide a simple and elegant solution for easily introducing a bulk of secondary tubes into a self-contained automated processing system in an ordered and one-by-one separable manner for further processing.

SUMMARY OF THE INVENTION

The present invention addresses the above described problems of simplified loading/unloading of secondary tubes into/from a self-contained automated processing system. As a first aspect of the present invention, a secondary tube tray for an automated processing system is provided, wherein the secondary tube tray comprises a base module and an insert for secondary tubes, also referred to as secondary tube insert, the secondary tube insert being adapted for holding and dispensing a plurality of secondary tubes in parallel, and particularly for holding and dispensing a plurality of secondary tubes having similar or identical diameters, wherein the secondary tubes can be uncapped and empty secondary tubes, and wherein the secondary tube insert is inserted into the base module. Further, the base module comprises a substantially closed bottom side with at least one discharge opening for discharging secondary tubes, and the secondary tube insert is a hollow body with at least one insert opening in its bottom side. Accordingly, the uncapped empty secondary tubes can be loaded into the secondary tube insert by a user in a parallel orientated manner. Due to the fact that the secondary tube tray has the secondary tube insert received in its base module, meaning that the base module is an outer component of the tray and the secondary tube insert is an inner component of the tray, the combination of base module and secondary tube insert is referred to as secondary tube tray, or alternatively consumable tube tray, due to the fact that secondary tubes are also referred to as consumable tubes used in the sense of disposables.

In general, the secondary tube tray of the present invention consists of a base module and a tray insert as mentioned above, wherein the base module can be designed to receive different tray inserts, thereby rendering the base module to be a basis for a so-called "multipurpose tray" which basically consists of a base module and one or several tray inserts, in the present invention at least one single secondary tube tray insert, also referred to as consumable tube tray insert, consumable tube insert or secondary tube insert.

Accordingly, the "multipurpose" property of such multipurpose tray is achieved by the exchangeability of the respective tray insert(s) received by the base module, for example in a mix and match manner, thereby achieving a high flexibility regarding the content to be received by the multipurpose tray when comprising one or several tray inserts. Accordingly, by means of the exchangeability of a tray insert, i.e. the ability to switch one tray insert with another tray insert, for example of the same or a different kind, the multipurpose functionality of the multipurpose tray is achieved. As a general alternative to the presently presented combination of the base module with the secondary tube insert, the base module theoretically can also be adapted to receive different other kinds of tray inserts, such as one or several universal tray inserts for receiving different kinds of primary tubes, one or several urine container tray inserts, and/or one or several tip rack tray inserts. Accordingly, the multipurpose property of the base module is achieved by the exchangeability of the tray insert, or also by the possibility to receive several tray inserts other than the secondary tube insert, thereby achieving a high flexibility. Thus, the base module including at least one secondary tube insert, i.e. the tray taking the function as secondary tube tray, has the same format in particular in regard to the same basic dimensions as a multipurpose tray when functioning, for example, as a primary tube tray (=multipurpose tray plus primary tube insert), resulting in the fact that the multipurpose tray can be handled by the same or a similar handling mechanism, such as a tray transport mechanism for transporting the tray inside the automated processing system, and through the same loading/unloading slots, irrespective of the chosen function of the multipurpose tray.

Now, as a particular example of a suitable tray insert for such multipurpose tray in order to provide the secondary tube tray of the present invention, the secondary tube insert is received in the base module of the secondary tube tray, wherein the secondary tube insert provides a hollow body for receiving the plurality of secondary tubes in a randomly horizontally orientated parallel manner, i.e. the tubes when arranged inside the hollow inner space of the secondary tube insert can be oriented generally in parallel, but must not be oriented uniformly in regard to a horizontal orientation of one secondary tube to another, meaning that the horizontally received secondary tubes can be randomly arranged in regard to their longitudinal axis, i.e. the open top of one secondary tube can be arranged next to the bottom of an adjacent secondary tube, or the other way around. Thereby, filling of the secondary tube insert of the secondary tube tray is simplified, since the secondary tubes do not have to be adjusted in order to have the exact same horizontal orientation, but can be randomly filled into the secondary tube insert in this regard, making a filling of the secondary tube insert faster and more effective.

Furthermore, in the inventive secondary tube tray of the present invention, either the secondary tube insert or the base module comprises a blocking mechanism which blocks or closes the discharge opening in the bottom side of the base module when not operated, i.e. when the blocking mechanism is not activated, wherein the blocking mechanism is adapted to be openable from the outside, i.e. the outside of the base module and, thus, from the outside of the secondary tube tray. In this regard, the discharge opening can thus allow discharging of at least one secondary tube in an open state of the blocking mechanism, wherein an open state of the blocking mechanism is achieved when the blocking mechanism is operated, i.e. when the blocking mechanism is activated from the outside. Here, the insert opening in the bottom side of the secondary tube insert can allow passage of a blocking mechanism actuating member from the outside through the bottom side of the base module to the blocking mechanism.

For allowing passage of a blocking mechanism actuating member from the outside through the bottom side of the base module to the blocking mechanism as mentioned above, the bottom side of the base module can comprise at least one actuation opening which can be provided next to the discharge opening in the substantially closed bottom side of the base module of the secondary tube tray, wherein the at least one actuation opening can be implemented as two actuation openings next to each other in parallel, and arranged in a rectangular manner in regard to the discharge opening, such that the discharge opening and the two actuation openings arranged next to each other in parallel assume a general U-shape in the bottom side of the base module of the secondary tube tray. Each actuation opening is provided so that a respective actuation member can pass through the bottom side of the base module and can also pass through the insert opening provided in the bottom side of the secondary tube insert and reach into the inside of the secondary tube insert from the outside in order to push or shuffle the stacked secondary tubes inside the secondary tube insert towards the discharge opening. Alternatively, the discharge opening can provide additional space for passage of the blocking mechanism actuating member from the outside through the bottom of the base module of the secondary tube tray to the blocking mechanism of the secondary tube insert, in order to activate the blocking mechanism and remove the blocking, in order to be able to dispense secondary tubes. The actuation member can be provided in the form of a cam member or the like, entering through the actuation opening in the course of a curved in-and-out movement, which is further described in more detail below. In an assembled state of the base module and the secondary tube insert, both the at least one actuation opening and the discharge opening provided in the bottom of the base module can be covered or overlapped by the insert opening in the bottom of the secondary tube insert, thereby allowing a plurality of free passages from the outside of the base module to the inside of the secondary tube insert, wherein the openings in the base module, i.e. the discharge opening and the one or more actuation openings, and the insert opening in the secondary tube insert are substantially aligned with each other. As an alternative to only providing one single insert opening in the bottom side of the secondary tube insert, the insert opening can also be implemented as a plurality of openings, which openings can coincide with the openings provided in the bottom of the base module, thereby resulting in several passages between the outside of the base module and the inside of the secondary tube insert.

In general, regarding the manufacturing of the secondary tray insert and/or the base module of the present invention, i.e. the secondary tube tray of the present invention, the same can be injection molded components, wherein the secondary tray insert and/or the base module can be made of polypropylene (PP) or polycarbonate blends, such as polycarbonate with styrene acrylonitrile (PC/SAN) and polycarbonate with acrylonitrile-butadiene-styrene (PC/ABS), which all constitute injection-moldable materials.

Regarding the general structure of the base module of the inventive secondary tube tray, the base module can comprise a rectangular structure with a substantially closed bottom side and at least partially closed side walls, usually four in number and thin-walled compared to the overall rectangular structure of the base module, wherein the upper side of the rectangular structure constitutes the above mentioned open side of the base module. With such structure, the base module constitutes a box shape with a substantially closed bottom, with the exception of the already mentioned at least one discharge opening aligning with the insert opening in the bottom of the secondary tube insert in order for the secondary tube tray to be able to dispense secondary tubes from inside the secondary tube insert to the outside of the base module. The base module can also comprise manufacturing-related holes or slits or the like. Moreover, the at least one discharge opening constitutes a general secondary tube discharge opening of the secondary tube tray, the discharge opening being aligned with the insert opening in the bottom of the hollow body of the secondary tube insert in order to provide a free passageway when not blocked by the blocking mechanism. In an open state of the blocking mechanism, the discharge opening provided in the substantially closed bottom of the base module of the secondary tube tray allows discharging of a secondary tube through the insert opening in the bottom side of the secondary tube insert and, subsequently, through the discharge opening provided in the substantially closed bottom side of the base module of the secondary tube tray.

Further, the box shape of the base module additionally comprises side walls, which can be continuously closed or which can only be closed in part, and an open upper side, substantially without any kind of wall surface or the like. Regarding the structure of the side walls, at least one of the at least partially closed side walls of the base module can comprise an opening in the form of an open side slot starting at the open upper side, i.e. the open upper side continues in the opening, and can continue toward the base module's bottom side, wherein the opening does not have to continue until the bottom side but can finish above the bottom, thereby constituting a window of the side wall open to the top. According to an alternative specific embodiment, each side wall of the base module can comprise such an opening or open recess constituting a side slot or side window of each side wall open to the top. Thereby, each corner of the rectangular structure comprises an angular corner post starting from the closed bottom and continuing to the open upper side, which angular corner posts can also be referred to as corner struts or corner pillars, achieving sufficient distance between the bottom side and the open side of the base module for receiving the secondary tube insert as well as the tubes provided therein, without interacting with another base module stacked on top of it.

The general structure of the secondary tube insert is similar to the basic structure of the base module, i.e. the hollow body of the secondary tube insert can exhibit an at least partially open top, or open upper side, and substantially closed side walls, resulting in a rectangular structure of the secondary tube insert with a substantially closed form comprising four closed side walls, i.e. two longitudinal extending side walls, or longitudinal side walls, and two transversely extending side walls, or transverse side walls, providing a general box shape, wherein the upper side of the rectangular structure constitutes the previously mentioned open upper side of the secondary tube insert which is provided for filling the plurality of secondary tubes into the hollow body of the secondary tube insert. With such structure, the secondary tube insert constitutes a box shape, optionally with a substantially closed bottom, with the exception of the already mentioned insert opening in its bottom, thereby providing the already mentioned inner space of the secondary tube insert for receiving the plurality of secondary tubes. Here, the insert opening in the bottom side of the secondary tube insert can be at least of the same dimension as the discharge opening in the bottom side of the base module, wherein the insert opening in the bottom side of the secondary tube insert can substantially extend over the entire surface area of the bottom side of the secondary tube insert, thereby rendering the substantially closed bottom of the secondary tube insert to be a substantially open bottom side. As particular embodiment, the inner space of the secondary tube insert, or better the inner space of the hollow body of the secondary tube insert can be sized to accommodate between 150 and 200 secondary tubes, for example about 170 secondary tubes, depending on the respective diameter of the sample tubes. In this regard, each secondary tube can exhibit a length in the range of 70 mm to 110 mm, for example about 105 mm, or more particular in a range between 75 mm to 100 mm, with a diameter in the range of 12 mm to 16 mm, for example 14 mm.

In order to be able to dispense the secondary tubes in an ordered and one-by-one separable manner for further processing, the blocking mechanism and the discharge opening in the bottom side of the base module are adapted for dispensing the secondary tubes one-by-one, in particular wherein the hollow body of the secondary tube insert comprises the at least one insert opening in its bottom side, i.e. an opening in the bottom surface or bottom plate of the hollow body of the secondary tube insert, which opening is sized to allow at least one single secondary tube from the plurality of the secondary tubes stacked inside the secondary tube insert to pass therethrough. Here, the insert opening can be a through-hole provided in the bottom of the secondary tube insert, and the insert opening can be dimensioned to be slightly broader than a longitudinal length of each secondary tube, meaning that the shape of the insert opening can be similar to a cross-sectional shape of the secondary tube to be dispensed through the insert opening, but bigger in dimension so as to allow the secondary tube to pass through the insert without the same getting stuck or becoming edged in the insert opening. Thus, in view of a usually elongated cylindrical tube shape of a secondary tube, resulting in a rectangular block shape in cross-section, the basic shape of the insert opening in the bottom of the secondary tube insert can also exhibit an elongated rectangular block shape. Now, since the secondary tubes are stacked inside the secondary tube insert in a horizontally arranged manner with both tube ends being in parallel to the longitudinal side walls of the box-shaped hollow body of the secondary tube insert, the longitudinal axis of the elongated rectangular block shape of the insert opening is orientated parallel to a longitudinal axis of each stacked secondary tube, i.e. parallel to each transverse side wall and, thus, in a right angle regarding the longitudinal side walls of the hollow body of the secondary tube insert, irrespective of the dimensioning of the insert opening, i.e. irrespective if the insert opening in the bottom side of the secondary tube insert is implemented as a relative small hole or if it extends over the entire surface area of the bottom side of the secondary tube insert. The same of course applies to the respective discharge opening in the bottom side of the base module of the secondary tube tray, which discharge opening is necessary to establish a generally free passage between the inside of the hollow secondary tube insert and the outside of the base module of the secondary tube tray for achieving a passage of a secondary tube from the inside to the outside of the secondary tube tray when dispensing secondary tubes. Regarding an exemplary dimensioning of the secondary tube insert of the secondary tube tray of the present invention, the same can exhibit a length in a range of 400 mm to 430 mm, for example about 417 mm, with a width of its inner space being in a range of 100 mm to 120 mm, for example about 110 mm, and with a width of its outer circumference including the bent upper edge being in a range of 140 mm to 160 mm, for example about 152 mm.

Regarding further structural features of the secondary tube tray of the present invention, the upper edge of each side wall of the secondary tube insert can be bent to the outside, in a general right-angled manner, for example in order to provide a smooth transition between the edge of the side walls of the secondary tube insert and respective side walls of the base module, as well as for improved filling properties of the secondary tube insert regarding the secondary tubes to be filled there into. Moreover, each side wall of the secondary tube insert can comprise notches or dents for structural reinforcement of the secondary tube insert, meaning that the inner surface of each side wall can comprise indentations directed to the outside, i.e. directed to the inner surface of the respective side wall of the base module, as reinforcement features for increasing the stability of the secondary tube insert and, thus, the secondary tube tray, as well as for manufacturing reasons. Alternatively or additionally, each longitudinal side wall of the secondary tube insert can comprise indentations on its outside directed to the inside of the secondary tube insert, i.e. away from the inner surface of the respective side wall of the base module, which can also function as reinforcement features for increasing the stability of the secondary tube insert and, thus, the secondary tube tray. Furthermore, with the latter structure of indentations on its outside directed to the inside of the secondary tube insert, which can exhibit the shape of a square with rounded corners, the secondary tube insert and, thus, the secondary tube tray can obtain a lightweight but stable structure.

Focusing on the blocking mechanism of the secondary tube tray of the present invention, the blocking mechanism can be implemented by means of a blocking bar, such as a flat rod or latch, which is movably arranged on an inside of the secondary tube insert, for example by means of recesses provided on the inside of the secondary tube insert on opposing side walls, wherein the blocking bar is held at both ends inside the recesses with the possibility to move inside the recesses, for example in a substantial vertical direction upwards and downwards, in order to block or unblock the insert opening provided in the bottom of the secondary insert opening, for allowing movement of the blocking bar between its blocking and unblocking position. Regarding the dimensions of such blocking bar, its length can be in a range of 100 mm to 120 mm, for example 115 mm, and its width can be in a range of 20 mm to 30 mm, such as 25 mm, wherein the length of the blocking bar extends in the lateral direction of the secondary tube tray, and its width extends along the longitudinal direction of the secondary tube tray. Here, according to a specific embodiment of the blocking mechanism, the blocking mechanism further comprises a biasing spring or the like, for urging the blocking bar into its blocking position by a biasing force, the blocking position being the position that blocks the insert opening so that no secondary tube can pass therethrough. In this regard, a next secondary tube to be dispensed can abut against the blocking bar when the same is urged into its blocking position, such that the abutting secondary tube can only be dispensed, i.e. can only pass through the secondary tube insert opening when the blocking bar is moved out of the way, for example upwards into its unblocking position, by which the abutting secondary tube receives free passage through the insert opening and, thus, through the discharge opening, i.e. to the outside of the secondary tube tray. Here, the biasing spring can be provided within the respective recess of each side wall in which the blocking bar is allowed to move upwards and downwards, in a way such that the blocking bar is spring-biased in its blocking position, wherein the blocking bar must be pushed into its unblocking position by means of an actuation component or the like, as described further below. Moreover, on the upper edge of the blocking bar, a bent plate can be arranged, which bent plate has a shorter lateral extension that the blocking bar and extends from the blocking bar to the adjacent lateral side wall, in order to prevent any secondary tube from getting jammed behind the blocking bar, and which plate serves to direct the secondary tubes inside the secondary tube tray in front of the blocking bar, ready for being dispensed through the insert opening.

As an alternative to the blocking bar solution as described above, the blocking mechanism can also be provided in the form of a hatch mechanism, wherein the hatch mechanism can comprise a hatch member, for example a hinged flap gate, as well as a biasing spring or the like. Here, the hatch member can be urged into its closed position by means of a biasing force, similar to the blocking bar as mentioned above, i.e. a position in which the flap gate closes or blocks the insert opening in the bottom of the secondary tube insert for dispensing the secondary tubes and prevents the secondary tubes from exiting, by means of at least one spring, such as a coil spring or the like, which is in direct connection with the flap gate and which can be attached, at the hinged end, to either one of the secondary tube insert or the base module. Furthermore, as to structural features of the hatch member, the flap gate can comprise an L-shape, with the longer flank providing the hinged flank end, and with the shorter flank providing a stopper for the succeeding secondary tube following a previously discharged/dispensed secondary tube. Moreover, a side wall of the hollow body of the secondary tube insert at the hatch member, i.e. the transverse side wall of the hollow body provided adjacent to the hatch member and, thus, adjacent to the insert opening, comprises a bulged recess allowing movement of the hatch member between its closed and open position, wherein the hatch member blocks passage to the secondary insert opening in its closed position, and wherein the hatch member allows or unblocks passage to the secondary insert opening in its open position. The bulged recess in the present implementation of the blocking mechanism is to be understood as a protrusion or bulged indentation of the mentioned transverse side wall of the secondary tube insert extending towards the inside of the secondary tube insert, allowing the hatch member of the hatch mechanism to be moved without interference with the respective part of the transverse side wall. Here, the bulged recess can be provided in a lower part of the transverse side wall, which lower part of the transverse side wall adjacent to the insert opening is protruding to the inside of the hollow body in a bulged manner, thereby providing a kind of hood over the hatch member of the hatch mechanism. Regarding the functionality of the hatch mechanism and its respective structure as well as the structure of its counterpart in the secondary tube insert, i.e. the insert opening provided in the bottom of the hollow body of the secondary tube insert, the hatch mechanism and the insert opening are adapted for dispensing the stacked secondary tubes one-by-one, i.e. in a row one after the other, wherein the insert opening in the bottom of the secondary tube insert can be adapted to allow access to the hatch mechanism from the outside, for example in order to be able to operate or actuate the hatch mechanism, and more particularly the hatch member of the hatch mechanism in order to be able to open the hatch mechanism, or to provide the means for being able to remove any blockage of the hatch mechanism, if any.

According to a further specific embodiment of the secondary tube tray of the present invention, the secondary tube insert is releasably engaged within the base module, for example by means of a releasable press-fit connection, a releasable push-in connection or a releasable snap connection. Accordingly, regarding the connection between the secondary tube insert and the base module of the secondary tube tray, the secondary tube insert can be press-fitted into the inner side of the base module, wherein the outer circumference of the secondary tube insert is brought into press-fitted engagement with the inner circumference of the base module in more than one location, such as in a circumferential manner, thereby resulting in a detachable press-fit connection. Thus, the releasable press-fit connection, also referred to as force-fit or interference connection, can be easily established by means of geometric dimensioning and tolerancing of the base module and the secondary tube insert, wherein the "fit" is implemented by a fastening between base module and secondary tube insert achieved by friction after these parts are pushed together, and wherein the allowance between base module and secondary tube insert determines their temporary joining. Furthermore, the secondary tube insert is releasably engagable within the open side of the base module by press-fit engagement of the secondary tube insert with the base module as already described previously. Alternatively or additionally, the secondary tube insert can also enter into a snap-fit connection or plug-in connection with the base module, provided that both parts comprise complementary snap-fit or plug-in features.

According to the above, the secondary tube insert can comprise engagement features, for being releasably engagable with, for example, cylindrical protrusions within an open side of the base module of the secondary tube tray, wherein the protrusions of the base module can also provide a kind of tongue of a tongue-and-groove connection, with the respective engagement features of the secondary tube insert providing the groove counterpart, for example by means of respective suitable engagement recesses or the like, which can be provided in an outer circumferential edge of the secondary tube insert. Alternatively, the engagement features can be provided in the form of plug-in connectors provided on a bottom side of the secondary tube insert, which connectors can be pushed into respective holes provided in the base module, for example center-holes of the respective protrusions of the base module. In the later cited embodiment, a push-in connection between the base module and the secondary tube insert can be achieved, which can also be detached again by simply pulling the secondary tube insert out of the base module, similar to the above described press-fit connection. Also, as a further alternative, the engagement protrusions can be provided in the form of snap-in latches, with the respective engagement features of the secondary tube insert providing the groove counterpart, for example by means of respective suitable engagement recesses or the like, in order to establish a snap-fit connection of the secondary tube insert with the base module. Of course, after engaging the secondary tube insert into the base module of the secondary tube tray, these components can additionally be fixed to each other, for example by means of adhesive or the like, in order to achieve a fixed connection between the secondary tube insert and the base module, if desired. Alternatively, the engagement features as described above can also provide a fixed engagement between these components, such that additional adhesive or the like can be avoided, but a fixed connection can still be established, if desired.

Any engagement of base module and secondary tube insert, releasable or fixed, as mentioned above, can result in that the secondary tube insert is at least partially enclosed by the base module in a framed manner without the secondary tube insert protruding to the outside of the base module. In such case, since the secondary tube insert does not protrude to the outside of the base module, and particularly does not protrude upwards to the outside of the base module, the base module can, thus, be adapted to be stackable on top of another base module of a secondary tube tray, or also on top of another base module of a multipurpose tray of the same type. Thereby, several base modules can be stacked on top of each other in a space-saving manner, irrespective of the tray insert inserted into each of the stacked base modules, which also contributes to user convenience since several differently equipped base modules can be stacked together when loaded with secondary tubes or, alternatively, primary tubes or the like, and can be carried or transported in the stacked arrangement, thereby improving transportability and also storability of the tube trays. In order to achieve such a stacking connection between at least two base modules on top of each other, the bottom side of each base module can comprise a step portion with reduced outer circumference, e.g. a narrowing step portion, which step portion matches into an upper edge of an open side of another base module. Accordingly, the step portion of the bottom side of the upper base module can be stacked into an upper edge of the open side of another base module, e.g. in a nestable manner.

As mentioned above, the base module can be open on one side, i.e. its upper or top side, wherein the secondary tube tray can also further comprise a removable cover adapted to close the open top of the secondary tube tray and the at least partially open top of the secondary tube insert. In doing so, the secondary tube tray can be stored without the risk of having any secondary tubes falling out of the secondary tray insert, or the like. Here, however, when using such cover, a stackability of the base modules as described above may only be given in case a similar stacking connection between the trays with cover is provided. Alternatively or additionally, the secondary tube insert can comprise such a removable cover or cover plate, for example in the form of a lid such as a metal lid, which lid can be removably attached within an upper portion of the secondary tube insert or on top of the open side of the secondary tube insert, in order to securely close the open upper side of the secondary tube insert. The removable cover plate of the secondary tube insert can also be used to put pressure on the stack of tubes within the secondary tube insert so that the tubes can be pushed out of the insert opening in the bottom side of the base module in case of an open blocking mechanism. In order to improve its handleability, the cover plate can comprise at least one central hole, such as a circular hole or two circular holes next to each other, in order to make it easier for an operator to grasp the cover plate with his/her fingers and to lift the cover plate off the secondary tube insert, for example when filling the secondary tube tray with secondary tubes. Moreover, at least one square pattern can be provided on the cover plate, preferably two square patterns, which can be used for tube fill level detection by a camera or the like. Furthermore, the cover plate can comprise markings on its top side, i.e. the side facing away from the inside of the secondary tube insert, which markings are analyzed by a tray shuttle camera or the like to determine an estimated fill level of the secondary tube tray.

According to a further specific embodiment of the inventive secondary tube tray, the base module can comprise, as an interface, at least one handle on its outer circumference for improved transportability of the base module, i.e. the tray, by an operator, such as laboratory personnel or the like, wherein the handle simplifies a grasping of the base module by the operator who can grasp the base module with one or two hands. Alternatively, the base module comprises, as an interface, two handles on its outer circumference opposite to each other, which even further improves the transportability of the base module by the operator, since the two opposite handles simplify a grasping of the base module by the operator who can grasp the base module with two hands. Moreover, the base module can also comprise, as an interface, at least one engagement indentation on its outer circumference, wherein the engagement indentation is not to be confused by a handle as described above, but is particularly provided for a tray carrier, or tray carrier instrument such as a tray shuttle or the like, of the automated processing system, which carrier can engage with the indentation and, thus, pick up the base module, for improved transportability of the base module by the tray carrier in the course of an automated transportation process. For the sake of convenience, the at least one engagement indentation is provided within a handle positioned on the base module's outer circumference, as described above. Thereby, it becomes possible for the base module to be picked-up and transported not only by a human operator, but also by an automated tray carrier instrument, at the identical location at the base module. Similar to the provision of two handles as described above in an alternative embodiment, the base module can comprise, as an interface, two engagement indentations, or even more than two indentations, if necessary, on its outer circumference opposite to each other for improved transportability of the base module by the tray carrier of the automated processing system, wherein each engagement indentation can be provided within a handle allocated on the base module's outer circumference. Thereby, it becomes possible for the base module to be picked-up and transported not only by a human operator, but also by an automated tray carrier instrument in the same manner as being picked-up by a human operator with two hands, at the identical locations at the base module. The above described interfaces are provided as interfaces either form human interaction or as interface to instruments of an automated processing system, wherein the interfaces can be provided for interaction with such an instrument for the transport to and from loading slots of the automated processing system, to a work deck of the automated processing system or for a general tray shuttle provided within the automated processing system.

According to a further specific embodiment of the inventive secondary tube tray, the base module can comprise at least one color indicator for indication of a loading status of a content of the secondary tube tray, i.e. a content of the secondary tube insert as received in the base module of the secondary tube tray. For example, the color indicator can provide different colors, which can indicate that the secondary tube tray carries new, i.e. unprocessed secondary tubes, already used secondary tubes, or also secondary tubes with erroneous content, wherein the new secondary tubes can be color-coded with green color and the already used secondary tubes, or secondary tubes with erroneous content, can be color-coded with red color. Here, as a specific embodiment, the color indicator can be operable manually by the operator, and/or can be implemented in the form of a rotating indicator plug or pole provided in a respective pocket in the base module, for example in one of several corner posts of the base module, wherein the pocket comprises a viewing window to the outside, in which the respective color can be shown and changed by rotation of the indicator pole. Also, in case that the secondary tube tray is not in need of loading status indication, a so-called blind plug can be fitted into the base module pocket, i.e. a plug without any different colors provided on it, such as a grey-colored plug or the like. Accordingly, the color indicator can be replaced, if desired, for improved user convenience. As additional aspect of the provision of the indicator in form of an indicator pole stuck into a pocket of the base module, any optical sensor of the automated processing system can be used to identify the correct loading of the secondary tube tray into a loading slot of the automated processing system, since the pocket is either provided on the end of the tray loaded first into the loading slot, or not. Depending on the desired orientation of the tray when loaded into the loading slot, the correct orientation or a false orientation can be detected and, for example, signalized to an operator.

Furthermore, in accordance with a further specific embodiment of the base module of the inventive secondary tube tray, the base module can comprise at least one writable surface on its outer circumference, in order for an operator to provide the base module with a human readable marking and allowing rapid marking and erasing of such markings on the surface by a human operator, if desired, wherein the writable surface can be implemented by means of a white-board material, i.e. a wipeable material, to be able to use it more than one time. Thereby, any operator can provide the base module, and, thus, the secondary tube tray with human-readable markings, if desired, which can easily be erased again. According to one specific implementation of the writable surface, the same can be provided by means of the placement of a label on a side wall of the base module, for example the right side of the base module, wherein it is useful if the writable surface in the form of the label can only be cleaned with alcohol or suchlike, in order to improve the durability of the operator's markings. Thus, the writable surface provides white space to label the trays with notes for co-workers or co-operators, or the like. In addition to the human-readable marking as described before, the base module of the secondary tube tray of the present invention can also comprise at least one identification code on its outer circumference, which can be an adhesive label or the like, carrying a human-readable machine-writing, which can provide substantial information about the base module or its content for a human operator. Alternatively or additionally, a machine-readable identification code can be provided on the outer circumference of the base module, for example implemented by a barcode or the like, or also in the form of a RFID tag or the like, which makes an automatic identification of the base module or its content in the automated processing system possible, such as the number of secondary tubes provided therein, and which can provide a unique identification code for each base module. For example, such barcode or RFID tag can consist of 3 characters for identification of the tray type, i.e. that the secondary tube insert type is provided in the base module, and 5 characters giving a consecutive serial number, for recordability reasons.

According to a further aspect of the present invention, a secondary tube handling module of an automated processing system for automatically processing biological sample is also provided in the course of the present invention, wherein the secondary tube handling module can be provided or used as a component arranged inside a housing of the laboratory system. Usually, an automated processing system, such as an analytical, pre-analytical or post-analytical processing system, which is commonly employed in state-of-the-art laboratories for automatically processing biological sample, can comprise one or more laboratory instrument(s) operatively connected to a control unit. The term "analytical" as used herein encompasses any process step carried out by one or more laboratory devices or operative units which are operable to execute an analytical test on one or more biological samples. In the context of biomedical research, analytical processing is a technical procedure to characterize the parameters of a biological sample or of an analyte. Such characterization of parameter comprises, for example, the determination of the concentration of particular proteins, metabolites, ions or molecules of various sizes in biological samples derived from humans or laboratory animals, or the like. The gathered information can be used to evaluate e.g. the impact of the administration of drugs on the organism or on particular tissues. Further analyses may determine optical, electrochemical or other parameters of the samples or the analytes comprised in a sample.

In general, before a chemical, biological, physical, optical or other technical analysis can be performed on a sample by such an analytical processing system, a variety of different pre-analytical processing steps may have to be executed on a sample of a patient by instruments of a pre-analytical processing system, such as sample centrifugation instrument for centrifuging a sample, sample resuspension instrument for resuspension of a sample, sample container capping or decapping instruments for capping and/or decapping a sample container, sample container labeling instrument for providing each sample container with a respectively printed label, a recapping instrument for recapping a sample container after decapping the same, and/or aliquotation instrument for dividing a sample into aliquots of the sample, and the like.

Now, in order to be able to transport a sample container such as a secondary tube within a laboratory system, the secondary tube must be dispensed from a secondary tube reservoir, such as the above described secondary tube tray filled with secondary tubes, and must be transported to the respective instrument, for example automatically. Here, the term "laboratory instrument" or "instrument" of the laboratory encompasses any apparatus or apparatus component operable to execute one or more processing steps/workflow steps on one or more biological samples, and covers pre-analytical instruments, post-analytical instruments and also analytical instruments. The expression "processing steps" thereby refers to physically executed processing steps such as centrifugation, aliquotation, sample analysis and the like. Furthermore, the term "pre-analytical" as used herein relates to the execution of one or more pre-analytical processing steps on one or more biological samples, thereby preparing the samples for one or more succeeding analytical tests.

The secondary tube handling module of the present invention is adapted to hold at least one secondary tube tray as described further above, wherein the secondary tube handling module comprises a separator for extraction of secondary tubes from the secondary tube insert of the secondary tube tray, the separator comprising a tilting mechanism for tilting the secondary tube tray about a lateral axis. Here, the tilting angle by which the tilting mechanism tilts the secondary tube tray about the lateral axis can be between 10° and 14°, in particular 12° about the lateral axis. Moreover, the secondary tube handling module comprises at least one blocking mechanism actuating member for actuating the above described blocking mechanism to unblock/block the insert opening, i.e. to open/close the insert opening in the bottom of the secondary tube insert, in order to be able to dispense at least one secondary tube on demand. The blocking mechanism actuating member can be implemented in the form of a pin, a spacer or the like. Also, the secondary tube tray and the blocking mechanism actuating member are movable relative to each other, which occurs when tilting the secondary tube tray about its lateral axis and towards the blocking mechanism actuating member, so that the blocking mechanism actuating member can be moved through the discharge opening in the bottom of the secondary tube tray and through the insert opening in the bottom of the secondary tube insert towards the blocking bar or the hatch member, so that the blocking mechanism actuating member can be brought into engagement with the blocking mechanism and actuate the same by forcing the blocking mechanism against its biasing force, in order to be able to dispense at least one secondary tube.

As a specific embodiment of the secondary tube handling module according to the present invention, the module can further comprise the already mentioned at least one cam member, for example in the form of a pusher or pushing wedge, for entering through the at least one actuation opening and the insert opening, for pushing or shuffling subsequent secondary tubes following the secondary tube to be dispensed next towards the discharge opening of the secondary tube tray, such that a steady flow of secondary tubes is dispensed through the discharge opening of the secondary tube tray when desired. This is achieved by an in-and-out movement of the cam member through the actuation opening of the base module and the insert opening of the secondary tube insert of the secondary tube tray. As a specific implementation of the cam member, an eccentric disk or the like can be used, wherein the tappet of the eccentric disk is used as the component for pushing the subsequent secondary tubes towards the discharge opening. As further component, the secondary tube handling module can further comprise a buffer intermediate storage for receiving multiple discharged or dispensed secondary tubes and storing the same temporarily, wherein the buffer intermediate storage can be arranged right after the discharge opening in order to receive the dispensed secondary tubes from the secondary tube tray. Accordingly, the buffer intermediate storage can comprise the blocking mechanism actuating member at its receiving end, in order to be able to actuate the blocking mechanism and cause the secondary tubes from the secondary tube tray to be dispensed into the buffer intermediate storage after exiting the discharge opening. Thereby, the buffer intermediate storage is used as buffer reservoir for intermediate or temporary storage of the just-dispensed secondary tubes. According to the present invention, the buffer intermediate storage can be used for determining a number of received discharged secondary tubes, wherein the buffer intermediate storage can comprise at least one buffer sensor for detecting an underrun of a predetermined buffer level of the number of received discharged secondary tubes.

Accordingly, the buffer intermediate storage can be used not only to receive a certain predetermined number of secondary tubes but can also be used to identify if the predetermined number of secondary tubes is contained in the buffer intermediate storage, wherein the predetermined number of secondary tubes constitutes the predetermined buffer level to be contained in the buffer intermediate storage. In case the buffer intermediate storage does not contain the predetermined number of secondary tubes, i.e. one or several secondary tubes are missing from the predetermined number, it can be concluded that no further secondary tubes are discharged, usually due to the fact that the secondary tube insert is empty. Accordingly, by means of the buffer level and by detection if the buffer level is reached by the dispensed secondary tubes, for example by means of an optical sensor, it can be determined if the secondary tube tray is empty and a new, filled secondary tube tray is required. As an example, the buffer intermediate storage can be adapted to receive a maximum of five (5) secondary tubes, wherein the predetermined buffer level can be predetermined to be four (4) secondary tubes. Accordingly, in case the buffer level is not reached, i.e. less than four (4) secondary tubes are contained in the buffer intermediate storage, it can be determined that the secondary tube tray should be changed in order to keep a steady flow of secondary tubes in the automated processing system.

According to a further specific embodiment of the secondary tube handling module of the present invention, the module can further comprise a secondary tube manipulator for grasping secondary tubes from a discharge end of the buffer intermediate storage, wherein the manipulator in its function as secondary tube grabber or secondary tube grasper is adapted to be able to actually grab or grasp at least one secondary tube in a steady manner, Thereby, the secondary tube handling module can provide the grasped secondary tube to a tube labeling component for label printing and label application on the grasped secondary tubes. Thus, the secondary tube manipulator is used as transfer means between the buffer intermediate storage and the tube labeling component, for example in the form of a robotic arm or the like. Moreover, the secondary tube manipulator can additionally comprise an orientation sensor for detecting the horizontal orientation of the secondary tube, in order to be able to provide the secondary tube in a suitable position to the tube labeling component. This means that the orientation sensor is used to determine if the grasped secondary tube is grasped in an upright manner, or in an upside down manner, wherein the secondary tube handling module can provide the secondary tube to the tube labeling component together with the information about the orientation of the secondary tube, i.e. upright or upside down, in order for the tube labeling component to print the label upright or upside down and apply it onto the secondary tube in a respective orientation. Alternatively, the secondary tube handling module can determine the orientation of the secondary tube, i.e. upright or upside down, and can correct the orientation of the secondary tube into the upright orientation, if required, in order to be able to provide the secondary tube to the tube labeling component in an upright manner in order to be able to label the secondary tube accordingly.

Further, in accordance with a specific embodiment of the present invention, the secondary tube handling module can also comprise a barcode reader for checking the label printed and applied to a respective secondary tube by the tube labeling component, which barcode reader is, thus, used as confirmation device for confirming the correct labeling of the labeled secondary tube. Furthermore, the secondary tube handling module can further comprise a secondary tube feeder for feeding the labeled and checked secondary tubes into a process rack for further processing, if identified as correctly labeled, or into a waste container, if identified as incorrectly labeled. Thereby, it can be achieved that no erroneously or incorrectly labeled secondary tube is used in the further workflow within the automated processing system.

As a further aspect of the present invention, a method of handling secondary tubes for use in automatically processing biological sample in an automated processing system is provided, wherein the method of handling the secondary tubes can be carried out by means of the secondary tube handling module as described above, and wherein the secondary tubes can be provided by the secondary tube tray as described further above. Here, the inventive method comprises the step of receiving the secondary tube tray by means of the secondary tube handling module and the subsequent step of tilting the secondary tube tray about its lateral axis by means of the tilting mechanism of the secondary tube handling module, wherein the tilting mechanism can tilt the secondary tube tray between 10° and 14° about its lateral axis, in particular 12°. Afterwards, the step of actuating the blocking mechanism of the secondary tube insert by means of the blocking mechanism actuating member is carried out, in order to open the insert opening in the bottom of the secondary tube insert and, if necessary, to actuate the cam member for pushing secondary tubes towards the discharge opening of the secondary tube tray, resulting in the buffer intermediate storage receiving discharged secondary tubes. Subsequently, the inventive method proceeds to the step of extracting a secondary tube from the discharging end of the buffer intermediate storage by means of the separator of the secondary tube handling module. Thereby, with the above described method, a secondary tube can be extracted from the filled secondary tube tray by means of the secondary tube handling module.

According to a specific embodiment of the present invention, the step of actuating the blocking mechanism can be implemented by moving the secondary tube tray and the blocking mechanism actuating member relative to each other, such that the blocking mechanism actuating member is moved through the discharge opening in the bottom of the base module of the secondary tube tray and the insert opening in the bottom of the secondary tube insert, engages with the blocking bar or the hatch member of the blocking mechanism and moves the same against the spring load to unblock or open the insert opening in the bottom of the secondary tube insert. Here, the described process can also be described as a pin or spacer pushing the blocking bar or the hatch member against a biasing spring load so that the blocking bar or the hatch member is lifted from the insert opening and enables free movement of a secondary tube inside the secondary tube insert in a passing-by manner past the blocking mechanism and through the insert opening which was previously covered by the blocking mechanism. Thus, the secondary tube tray comprises a kind of self-closing mechanism for covering the insert opening when not activated, resulting in the fact that a not handled secondary tube tray does not allow the secondary tubes to accidentally pass or fall through the insert opening during transport of the secondary tube tray, or the like.

Moreover, the inventive method can further comprise the additional step of grasping the extracted or dispensed secondary tube from the discharge area of the buffer intermediate storage by means of the secondary tube manipulator, the step of determining a horizontal orientation of the grasped secondary tube by means of the orientation sensor, the step of providing the grasped secondary tube in a suitable position to the tube labeling component, based on the determined horizontal orientation of the grasped secondary tube, and the step of printing a label for the grasped secondary tube and applying the same onto the grasped secondary tube. Thus, the horizontal orientation of each secondary tube can be determined and, if desired, adjusted in order for the label printing and applying to be carried out in a reasonable manner, without the chance of false labeling of a secondary tube which then might have to be disposed of. Thus, the previously described inventive method results in the fact that less or none secondary tubes have to be disposed of due to false or unreadable labeling. Additionally, as a further specific embodiment, the method can further comprise the step of checking if the grasped secondary tube is correctly labeled by means of the barcode reader, wherein, in case the grasped secondary tube is identified as correctly labeled, the correctly labeled secondary tube is fed into a process rack for further processing, for example by the secondary tube feeder, or, in case the grasped secondary tube is identified as incorrectly labeled, the incorrectly labeled secondary tube fed into a waste container, for example by the secondary tube feeder. However, based on the previous method steps, the occurrence of an incorrectly labeled secondary tube should be reduced to almost zero. As a further step, for the sake of further handling the secondary tube in the course of the processes inside the automated processing system, the method can further comprise the step of moving the loaded process rack into a pipetting position for further processing.

In order to be able to determine the filling level of secondary tubes within the secondary tube insert of the secondary tube tray, the above described inventive method can further comprise the step of determining a number of secondary tubes received in the buffer intermediate storage by means of a buffer sensor, such as an optical sensor or the like, the step of comparing the determined number of received secondary tubes with a predetermined minimum buffer level, and, in case the determined number of received secondary tubes is lower than the predetermined minimum buffer level despite the actuation of the cam member, the step of determining that the secondary tube insert of the secondary tube tray is empty. Thereby, the buffer intermediate storage has the purpose of monitoring means for monitoring the filling level of the secondary tube insert, and, thus, it can be determined that the secondary tube tray should be exchanged, before the secondary tubes are actually running out, due to the remaining secondary tubes in the buffer intermediate storage. Accordingly, in case it is determined that the secondary tube insert of the secondary tube tray is empty, which can be determined based on the monitoring of the buffer level and comparing the same with the predetermined buffer level, the empty secondary tube tray has to be replaced. With such inventive method, a running out on secondary tubes can be avoided, and a continuing automated processing of biological sample can be ensured.

The above described method steps can be controlled by a control unit of the automated processing system, which can also control the actuation or movement of the above described devices, such as the secondary tube handling module and its components, as well as the orientation sensor, a buffer level sensor, tube labeling component, the barcode reader, etc., wherein the term "control unit" as used herein encompasses any physical or virtual processing device, such as a CPU or the like, which can also control the entire automated processing system comprising one or more laboratory instruments in a way that workflow(s) and workflow step(s) are conducted by the automated processing system. The control unit may, for example, carry different kinds of application software and instruct the automated processing system or a specific instrument or device thereof to conduct pre-analytical, post analytical and analytical workflow(s)/workflow step(s). The control unit may receive information from a data management unit regarding which steps need to be performed with a certain sample. Further, the control unit might be integral with a data management unit, may be comprised by a server computer and/or be part of one instrument or even distributed across multiple instruments of the automated processing system. The control unit may, for instance, be embodied as a programmable logic controller running a computer-readable program provided with instructions to perform operations. Here, in order to receive such instructions by a user, a user interface can additionally be provided, wherein the term "user interface" as used herein encompasses any suitable piece of application software and/or hardware for interactions between an operator and a machine, including but not limited to a graphical user interface for receiving as input a command from an operator and also to provide feedback and convey information thereto. Also, a system/device may expose several user interfaces to serve different kinds of users/operators.

As used herein and also in the appended claims, the singular forms "a", "an", and "the" include plural reference unless the context clearly dictates otherwise. Similarly, the words "comprise", "contain" and "encompass" are to be interpreted inclusively rather than exclusively; that is to say, in the sense of "including, but not limited to". Similarly, the word "or" is intended to include "and" unless the context clearly indicates otherwise. The terms "plurality", "multiple" or "multitude" refer to two or more, i.e. 2 or >2, with integer multiples, wherein the terms "single" or "sole" refer to one, i.e. =1. Furthermore, the term "at least one" is to be understood as one or more, i.e. 1 or >1, also with integer multiples. Accordingly, words using the singular or plural number also include the plural and singular number, respectively. Additionally, the words "herein," "above,", "previously" and "below" and words of similar import, when used in this application, shall refer to this application as a whole and not to any particular portions of the application.

The description of specific embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize. Specific elements of any foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

The following examples are intended to illustrate various specific embodiments of the present invention. As such, the specific modifications as discussed hereinafter are not to be construed as limitations on the scope of the present invention. It will be apparent to the person skilled in the art that various equivalents, changes, and modifications may be made without departing from the scope of the present invention, and it is thus to be understood that such equivalent embodiments are to be included herein. Further aspects and advantages of the present invention will become apparent from the following description of particular embodiments illustrated in the figures.

LIST OF REFERENCE NUMERALS

Figure 1:
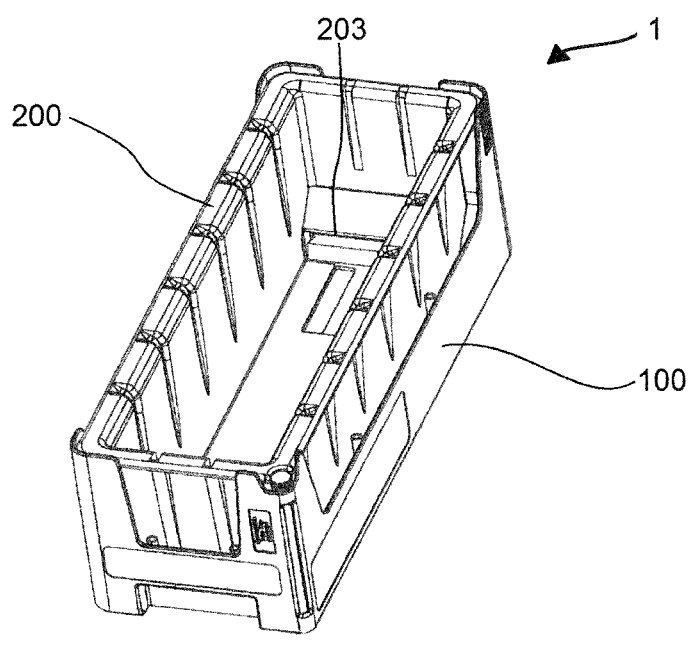
FIG. 1 is a schematic perspective illustration of a secondary tube tray according to an embodiment of the present invention, consisting of a base module and a secondary tube insert inserted therein.

1 secondary tube tray
1' secondary tube tray (with modified secondary tube insert)
1" secondary tube tray (with further modified secondary tube insert)
100 base module
101 bottom/bottom side of the base module
1011 discharge opening
1012 actuation opening
102 side plate/side wall
103 side slot/window
104 corner post
1041 corner post window
1042 top indentation
105 step portion
106 handle
1061 engagement indentation
107 color indicator
1071 rotary knob
108 writable surface 109 identification code 110 engagement protrusion 2 secondary tube 200 secondary tube insert 200' secondary tube insert (modified)

200" secondary tube insert (further modified)

201 bottom/bottom side of the secondary tube insert

201' open bottom/bottom side of the modified secondary tube insert

201" open bottom/bottom side of the further modified secondary tube insert 202 side plate/side wall of the secondary tube insert 202' side plate/side wall of the modified secondary tube insert 202"a longitudinal side plate/side wall of the further modified secondary tube insert 202"b1 first cross side plate/side wall of the further modified secondary tube insert at the discharge opening side 202"b2 second cross side plate/side wall of the further modified secondary tube insert at the discharge opening opposite side 2021 bent upper edge 2022 notch 2022' notch 2022" indentations 203 insert opening/secondary tube insert opening 203' insert opening/modified secondary tube insert opening 203" insert opening/modified secondary tube insert opening 204 inwardly bulged recess 204" separating element 205 ledge 206' recess 206" recess 207" label 208" cover plate 2081" gripping hole 2082" slot 300 hatch member 300' blocking bar 300" blocking bar 4 secondary tube handling module 41 separator 411 tilting mechanism 42 buffer intermediate storage 421 buffer level sensor 422 buffer intermediate storage chute 4221 blocking mechanism actuating member 43 cam member 44 tube orientation sensor 45 secondary tube manipulator 46 tube labeling component 47 barcode reader 5 drawer 6 secondary tube feeder 61 process rack 7 waste container

DETAILED DESCRIPTION

In FIG. 1, a secondary tube tray 1 according to an embodiment of the present invention is shown in the form of a schematic perspective illustration. Here, the secondary tube tray 1 consists of a base module 100 of a multipurpose tray and a secondary tube insert 200 as respective necessary insert. Usually, according to the choice of tray insert inserted into the base module 100, the purpose of the thus resulting multipurpose tray can change. In the present case, with the insertion of the secondary tube insert 200 into the base module 100, the multipurpose tray adopts the purpose of a tray for carrying secondary tubes, i.e. becomes the secondary tube tray 1. In the following, the base module 100 is described in further detail, and, subsequently, the secondary tube insert 200 is described in further detail based on respective illustrations in the drawings, as well as the interaction between these parts for dispensing preferably empty and uncapped secondary tubes 2, see also FIG. 5.

Figure 2:
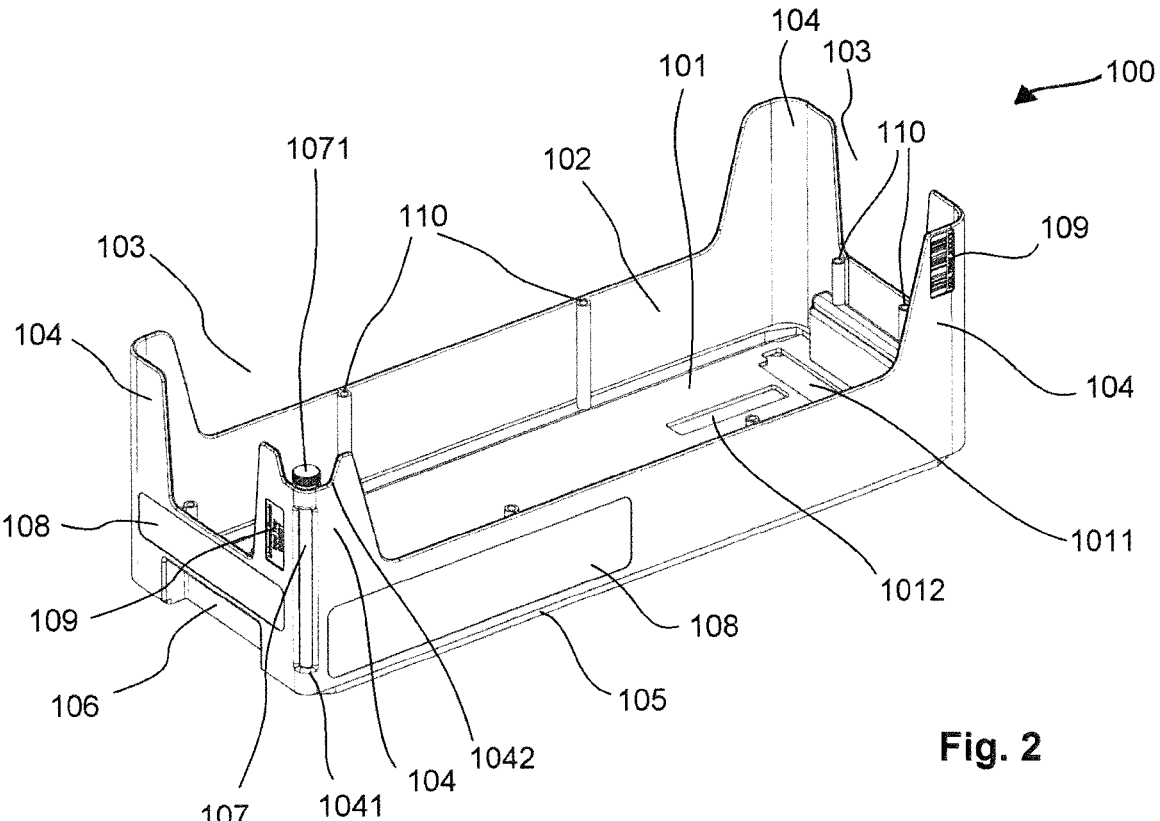
FIG. 2 is a schematic perspective illustration of a base module of a multipurpose tray used to constitute the secondary tube tray as shown in FIG. 1.

As basis for the secondary tube tray 1, the base module 100 as shown in FIG. 2 is used, which base module 100 according to a specific embodiment of the present invention basically consists of one integrally formed component, which can be injection-molded from polypropylene (PP) or a polycarbonate blend, such as polycarbonate with styrene acrylonitrile (PC/SAN) or polycarbonate with acrylonitrile-butadiene-styrene (PC/ABS). The base module 100 of the presently described specific embodiment is a general box-like structure with a substantially closed bottom or bottom side 101, a circumferentially extending side plate 102 in the form of four thin-walled side walls connected with each other and connected with the bottom side 101, and an open upper side. Inside the base module 100, protrusions 110 are provided on the inner wall surface of the side plate 102, which protrusions 110 are cylindrically formed columns with a center hole, respectively, which annular columns are protruding laterally inward from the side plate 102, i.e. the protrusions 110 are connected, at their base end, with the substantially closed bottom side 101, and each protrusion 110 is integrally connected with the side plate 102 by means of an integrally formed connection part. Here, in the presently described specific embodiment, 8 protrusions 110 are provided.

Each protrusion 110 can constitute an engagement protrusion 110 for engagement with a respective engagement feature of a tray insert, if applicable. In each side wall of the side plate 102, an open side slot 103 is provided, which side slot 103 extends from the open upper side, i.e. the open upper side continues in the open side slot 103, thereby constituting four windows of the side plate 102 open to the top. Here, the protrusions 110 only extend over the height of the respective side wall, i.e. the protrusions 110 do not extend upwards into the open side slot 103. As a result of the provided side slots 103, each corner of the rectangular base module 100 constitutes an angular corner post 104 starting from the bottom side 101 and continuing to the open upper side, which angular corner posts 104 generate sufficient distance between the closed bottom side 101 and the open upper side for the base module 100 to be able to receive the secondary tube insert 200 as well as the respective content in the form of secondary tubes 2 provided therein, without interacting with another base module (not shown) in case such further base module is stacked on top of it. Accordingly, the base module 100 is stackable on top of another base module of the same type, resulting in a stackability of the base modules 100 in a space saving manner, independent from the used tray insert. In order to achieve the stacking connection between at least two base modules 100 on top of each other, the lower or outer surface of the bottom side 101 of each base module 100 comprises a step portion 105 with reduced outer circumference, i.e. the step portion 105 is formed as a narrowing step portion, which step portion 105 matches into an inner side of an upper edge of the open side of another base module (not shown), or more specifically into the inner side of the thin-walled angular corner posts 104 of such base module being identical to the base module 100. Accordingly, the step portion 105 on the bottom side 101 of the upper base module 100 can be stacked into an upper edge of the open upper side of another base module (not shown), e.g. in a nestable manner.

Furthermore, the base module 100 comprises two handles 106 on its outer circumference, i.e. on the outer side of the side plate 102, for improved transportability of the base module 100 by an operator, wherein the handles 106 are provided in opposite side walls, thus opposite to each other, and wherein each handle 106 simplifies a grasping of the base module 100 by the operator. The handles 106 are provided in an integral manner inside the side plate 102, i.e. formed in the manner of side pockets protruding into the inside of the base module 100, as can be gathered from FIG. 2. Here, it is to be noted that the handles 106 do not interfere with the step portion 105 and, thus, do not interfere with the stackability feature of the base module 100. Furthermore, since the open side of the handle 106, i.e. the open side of the pocket formed by the handle 106 is open to the side, an operator is able to grasp into the respective handle 106 even when the base module 100 is stacked on top of another base module.

Figure 4:
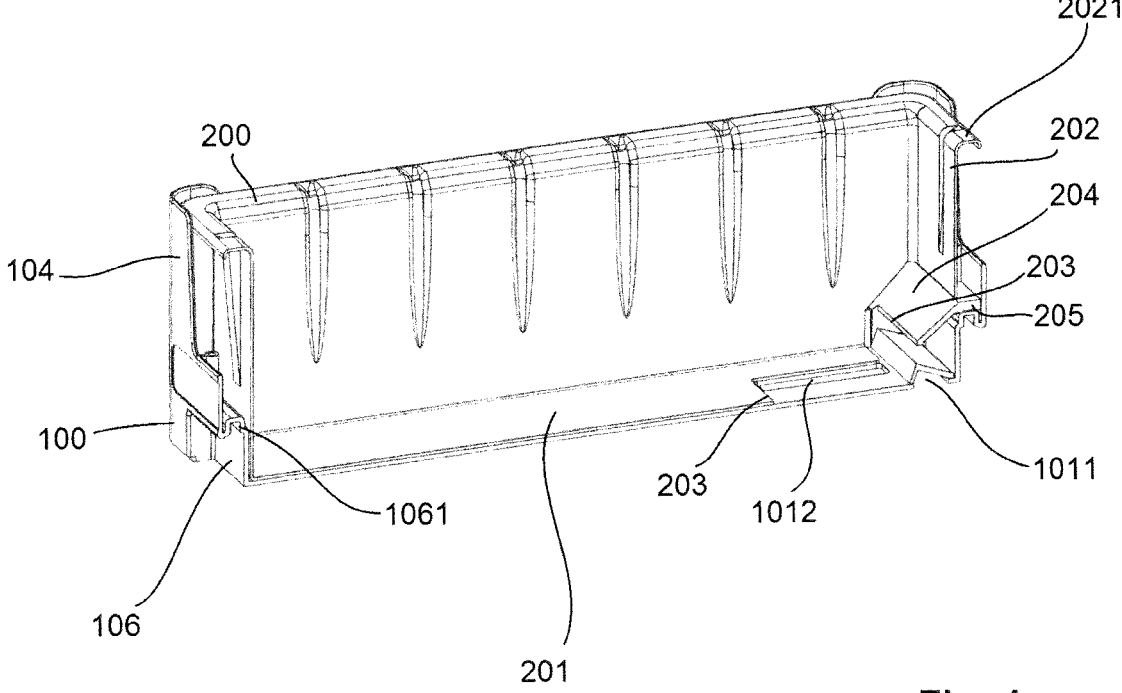
FIG. 4 is a schematic perspective illustration of the secondary tube tray of FIG. 3 cut along the plane A-A of FIG. 3.

Moreover, the base module 100 of the presently described specific embodiment can comprise, as a further interface, an engagement indentation 1061 on its outer circumference, see also FIG. 4, wherein the engagement indentation 1061 is not to be confused with one of the handles 106 as described above, but is particularly provided for a tray carrier, or tray handling instrument of the automated processing system, for improved transportability of the base module 100 by the tray handling instrument in the course of an automated transportation process, which is described in further detail lateron. In more detail, one or more engagement indentations 1061 can be provided within each handle 106, wherein each engagement indentation 1061 is formed by a notch provided inside the handle pocket, for example in a manner in that the engagement indentation 1061 extends upwards inside the upper side of the handle pocket, thereby allowing a gripper or handle in order to engage into the engagement indentation 1061 and, thus, achieve a secure grip of the base module 100 and, thus, of the secondary tube tray 1 by means of a tray handling instrument or the like.

As further feature of the base module 100 as depicted in FIG. 2, the base module 100 comprises a rotatable color indicator 107 for indication of a loading status of the secondary tube tray 1, i.e. a content of the secondary tube insert 200 as received in the base module 100. Here, the color indicator 107 is provided in the form of a manually operable rotating indicator pin or pole arranged in a respective stud hole provided in one of the corner posts 104 of the base module 100, wherein the stud hole comprises a viewing window 1041 to the outside of the base module 100, in which the respective color can be shown and changed by rotation of the color indicator 107. The color indicator 107 in the form of the described pin embedded in the hole in the respective corner post 104 comprises an actuation portion in the form of a rotary knob 1071. The respective corner post 104 comprising the stud hole for the color indicator 107 exhibits a top indentation 1042 at its top end, in which the rotary knob 1071 is arranged in a rotatable manner, so that the rotary knob 1071 does not extend over the upper edge of the corner post 104, in order to maintain the stackability property of the base module 100. Due to the color indicator 107, its stud hole and the top indentation 1042 at its top end, it becomes also possible to clearly determine the loading direction of the base module 100, since, referring to its geometry, a tray comprising the base module 100 can also be loaded into loading slots of an automated processing system with a turn of 180° around its Z-pivot, i.e. with the color indicator 107 on its back end, since the structural marks in the form of the color indicator 107, its stud hole and the top indentation 1042 at its top end are detectable by optical sensors of the automated processing system, enabling the same to detect if the tray was wrongly provided into one of the loading slots. Here, following states can be detected: "Tray not available", "Tray available", and "Tray available (inverted loading with a turn of 180°)".

As one particular color example, the color indicator 107 can provide two different colors, which can indicate that the secondary tube tray 1 contains secondary tubes 2, or that the secondary tube tray 1 is empty. Also, in case it is decided that the secondary tube tray 1 is not in need of loading status indication, a so-called blind plug can be fitted into the stud hole of the corner post 104 instead of the color indicator 107, i.e. a plug without any different colors provided on it, such as a grey-colored plug or the like. Accordingly, the color indicator can be replaced, if desired, for improved user convenience. Accordingly, a blind plug can be reasonable when using a secondary tube insert 200, the main purpose of which is to carry consumables without the need of any further indication. Here, such blind plug can have the same structural design as the color indicator 107, however without any color markings on its outer circumference. According to a further aspect of the presently discussed specific embodiment of the inventive base module 100, the base module 100 can comprise two writable surfaces 108 on the outer circumference of the side plate 102, in order for an operator to provide the base module 100 with a human readable marking and allowing rapid marking and erasing of such markings on the surface of the base module 100 by a human operator, if desired, wherein each writable surface 108 is implemented by means of a whiteboard material, i.e. a wipeable material. Moreover, the base module 100 can have one or several identification codes 109 on its outer circumference, which can be an adhesive label or the like, carrying a human-readable machine-writing or a machine-readable identification code 109 implemented by a barcode, both of which are provided on the side plate 102 of the base module 100 as illustrated in FIG. 2.

Figure 3:
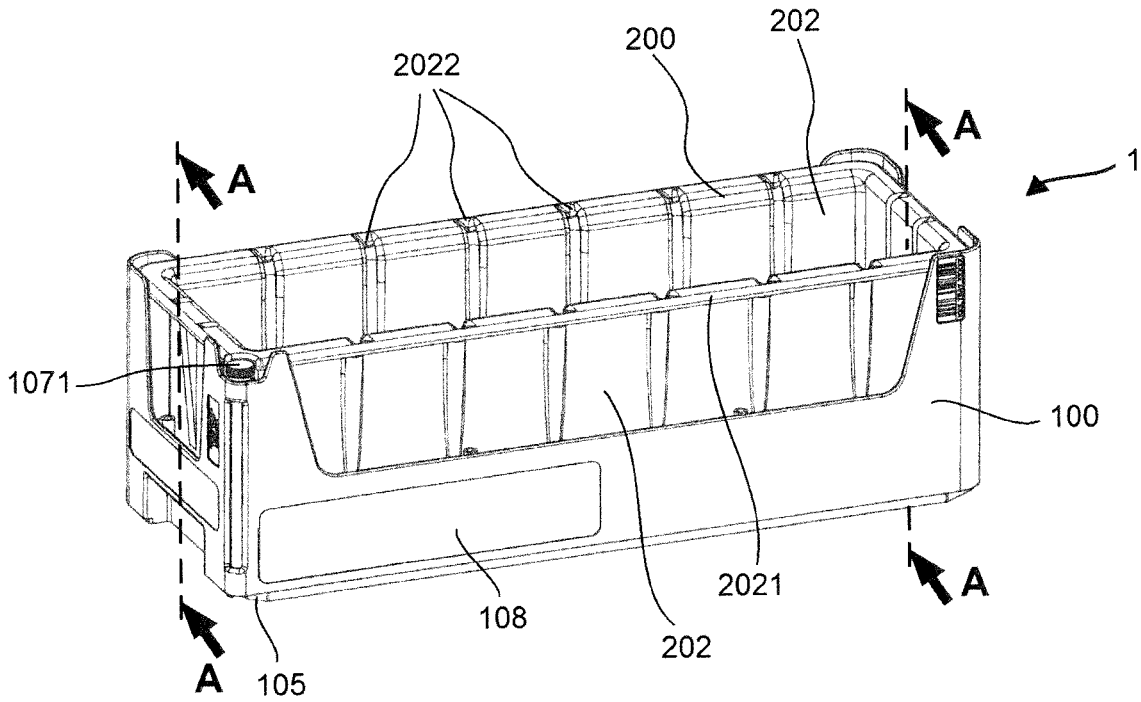
FIG. 3 is a schematic perspective illustration of the secondary tube tray as shown in FIG. 1 from another perspective.

Regarding the structural features of the secondary tube insert 200 as press-fitted into the base module 100 in order to constitute the secondary tube tray 1, it can be gathered from FIGS. 1, 3 and 4 that the secondary tube insert 200 basically comprises a similar structure as the base module 100, i.e. the secondary tube insert 200 comprises a substantially hollow body with a bottom side 201, either substantially closed or open, and four closed side walls 202, and with an open upper side, resulting in a rectangular structure of the secondary tube insert 200, wherein the four closed side walls 202 comprise two longitudinal extending side walls and two transversely extending side walls, wherein the open upper side of the rectangular structure is provided for filling the plurality of secondary tubes 2 into the hollow body of the secondary tube insert 200. Regarding further structural features of the secondary tube insert 200, it can be gathered from, for example, FIGS. 1, 3 and 4 that the upper edge 2021 of each side wall 202 of the secondary tube insert 200 of the presently described embodiment of the invention is bent to the outside, in order to establish a close contact to the adjacent parts of the base module 100, such that a smooth transition between the secondary tube insert 200 and the side walls 102 of the base module 100 is achieved. Furthermore, each of the side walls 202 of the secondary tube insert 200 comprises several notches 2022 for structural reinforcement of the side walls 202 of the secondary tube insert 200, meaning that the inner surface of each side wall 202 comprises respective indentations or dents in the form of the notches 2022 directed to the respective inner surface of the respective side wall 102 of the base module 100, serving primarily as reinforcement features for increasing the stability of the secondary tube insert 200.

Now, as can also be gathered from FIGS. 1, 2, and 4 to 6, the secondary tube tray 1 comprises openings in its bottom surface, which openings are provided in order to be able to dispense secondary tubes 2 from the inside of the secondary tube insert 200 to the outside of the base module 100, in particular to the area below the base module 100 adjacent to these openings. In further detail, as can be gathered particularly from FIG. 2, the bottom of the base module 100 with its general box-like structure may have the substantially closed bottom side 101; however, there are several openings in the form of through-holes provided in the bottom side 101 of the base module 100, i.e. the substantially closed bottom side 101 is closed but for the provision of these through-holes. In particular, the bottom side 101 of the base module 100 comprises a discharge opening 1011, as one of the previously described through-holes, for discharging secondary tubes 2 from the base module 100, wherein the discharge opening 1011 is aligned with a corresponding insert opening 203 in the bottom side 201 of the secondary tube insert 200 as described later in further detail. Moreover, the bottom side 101 of the base module 100 comprises at least one actuation opening 1012, as another one of the previously described through-holes, which actuation opening 1012 is provided adjacent to the discharge opening 1011 in the bottom side 101 of the base module 100, wherein the discharge opening 1011 as well as the one or several actuation openings 1012 are aligned with the insert opening 203 in the bottom side 201 of the secondary tube insert 200 as also described in further detail below, so that an open passageway between the outside of the base module 100, in particular its outside below the bottom side 101 of the base module 100, and the inside of the secondary tube insert 200 exists, which open passageway can be temporarily blocked or closed, if desired, by a blocking mechanism or the like as described in the following.

Figure 5:
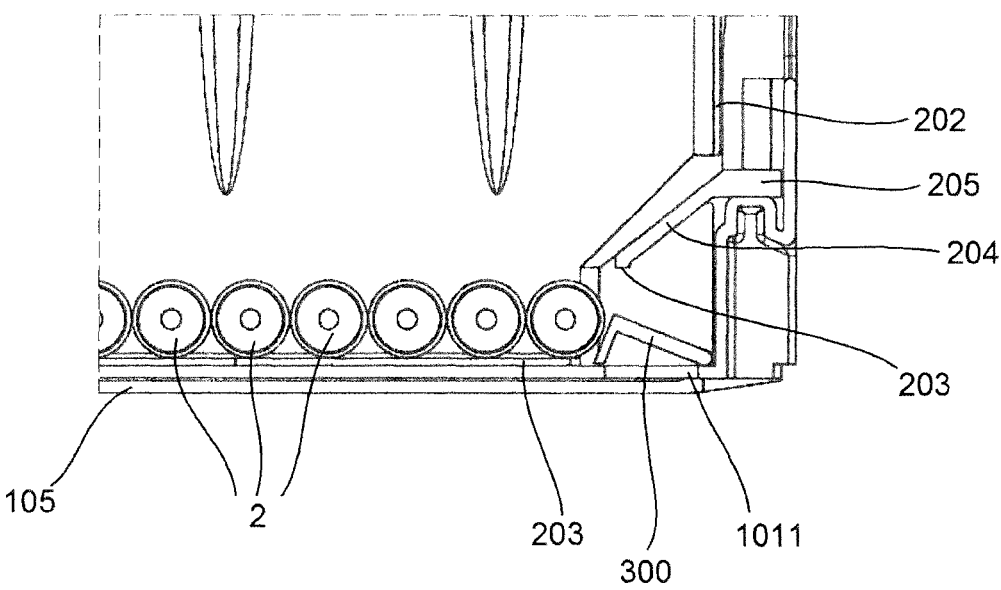
FIG. 5 is an enlarged detail of the cut schematic illustration of FIG. 4, including several secondary tubes, with a hatch mechanism in a closed state.

Regarding the above mentioned opening in the bottom side 201 of the secondary tube insert 200, which is provided in order to be able to dispense the secondary tubes 2 in an ordered and one-by-one separable manner for further processing, the hollow body of the secondary tube insert 200 comprises the already mentioned insert opening 203 in its bottom side 201, which insert opening 203 of the presently described embodiment continues upwards into the respective transversely extending side wall 202 and is sized to allow one single secondary tube 2 from the plurality of the secondary tubes 2 stacked inside the secondary tube insert 200 to pass through, see in particular FIG. 5, in which the first secondary tube 2 on the right side is already trying to pass through the insert opening 203, but is stopped before reaching the discharge opening 1011. Here, it can also be gathered that the transversely extending side wall 202, which comprises part of the continued insert opening 203, comprises a recess 204 bulging towards the inside of the secondary tube insert 200, which recess 204 is a protrusion or bulged indentation in a lower part of the transverse side wall 202 of the secondary tube insert 200 going inwards, and which recess 204 constitutes the part of the transversely extending side wall 202 allowing the insert opening 203 to continue upwards. Moreover, the transverse side wall 202 incorporating the inwardly bulged recess 204 further comprises a ledge 205 protruding to the outside of the secondary tube insert 200, which ledge 205 rests on the previously described engagement indentation 1061 provided in the handle 106, as means of fixing a relationship between the secondary tube insert 200 and the base module 100 in particular regard to the recess 204.

Figure 6:
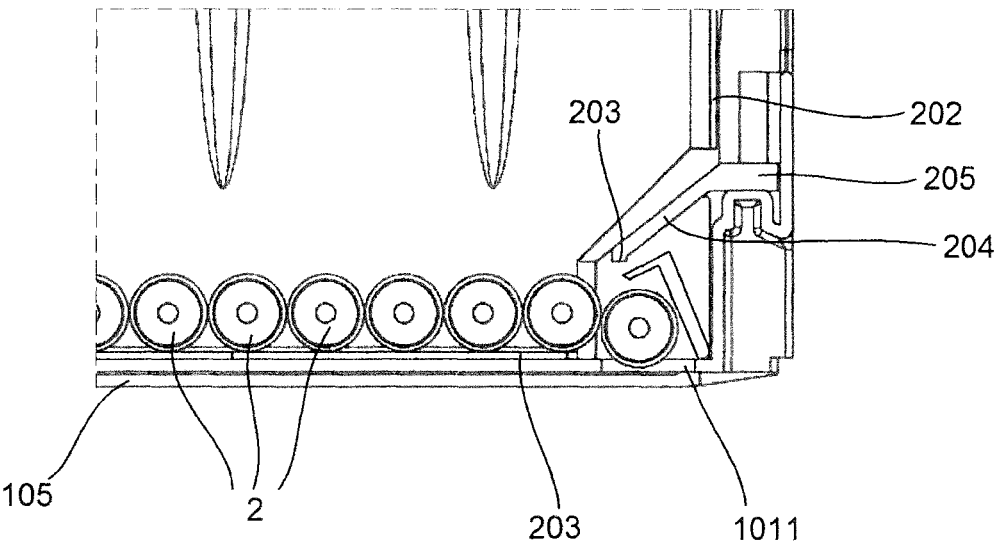
FIG. 6 is an enlarged detail of the cut schematic illustration of FIG. 4, including several secondary tubes, with a hatch mechanism in an open state.

As can be gathered from FIGS. 5 and 6, the secondary tube tray 1 also comprises a blocking mechanism in the form of a hatch mechanism comprising a hatch member 300, wherein the hatch mechanism also comprises a spring (not shown) biasing the hatch member 300 in a closed position as shown in FIG. 5. The spring can be implemented as a coil spring being in direct connection with the hatch member 300 and attached, at its hinged end, to the inner side of the base module 100, for example by means of a hinge joint. The hatch member 300 serves for closing or blocking the insert opening 204 in the bottom side 201 of the secondary tube insert 200, i.e. at least the part of the insert opening 203 which would allow a secondary tube 2 to pass through, see also FIG. 6. Further, at the same time, the hatch member 300 also closes or blocks the discharge opening 1011 provided in the bottom side 101 of the base module 100. Due to the biasing of the hatch member 300, the hatch member 300 maintains its closed position when not operated, i.e. when not activated. Now, as can be seen when comparing FIGS. 5 and 6, the hatch member 300, when activated, for example by means of a blocking mechanism actuating member as described further below, can move or pivot into an open position, see FIG. 6, against the biasing spring force, thereby moving from a closed or blocking position into an open or unblocking position. Here, for the sake of better overview, such a blocking mechanism actuating member for actuating the hatch member 300 from the outside is omitted in FIGS. 5 and 6. As can also be gathered from FIG. 5, the hatch member 300 additionally serves as stopper for stopping the first secondary tube 2 on the right side, which is the next secondary tube 2 to pass through the insert opening 203, before reaching the discharge opening 1011. In further detail, the hatch member 300 can also be described as a hinged flap gate, wherein the hatch member 300 in the presently described embodiment comprise an L-shape, with the longer flank providing the hinged flank end, and with the shorter flank providing a stopper for the secondary tube 2 next in line, see FIG. 5. Accordingly, the hatch member 300 of the hatch mechanism, the insert opening 203 and the discharge opening 1011 are adapted to each other in order to be able to dispense the stacked secondary tubes 2 one-by-one, i.e. in a row one after the other, as shown in FIGS. 5 and 6, wherein the insert opening 203 as well as the discharge opening 1011 allow access to the hatch member 300 from the outside, in order to be able to operate the hatch mechanism for the same to be opened, i.e. to unblock the insert opening 203 when flapped open.

As can be observed when considering the movement of the hatch member 300 from a closed position as shown in FIG. 5 into an open position as shown in FIG. 6, the recess 204 is instrumental for the blocking mechanism of the presently described embodiment for allowing a movement of the hatch member 300 between its closed and open position, since the hatch member 300 can then be moved without interference with the respective end part of the recess 204 providing an edge of the insert opening 203. Thereby, the recess 204 serves as a kind of hood arranged over the hatch member 300 of the hatch mechanism, wherein the hatch member 300, in its open position, can be fully accommodated in the bulge of the recess 204, i.e. in an area between the outside of the secondary tube insert 200 and the inside of the base module 100, thereby providing a clear passageway for the secondary tubes 2 to be dispensed from the secondary tube tray 1. Accordingly, the hatch member 300 can close or block the insert opening 203 and the discharge opening 1011 provided in the bottom of the base module 100 of the secondary tube tray 1, wherein the hatch member 300 can be opened by lowering it, by means of a tilting movement, onto a component of a separator 41 of a secondary tube handling module 4 functioning substantially as barcode labeler for secondary tubes 2. At open hatch, the secondary tubes 2 are conveyed through the bottom side 101 of the base module 100, which is described in further detail below. Otherwise, the hatch member 300 remains closed and interrupts the conveyance of the secondary tubes 2 through the insert opening 203 and the discharge opening 1011 from the inside of the secondary tube tray 1 to its outside.

Figure 7:
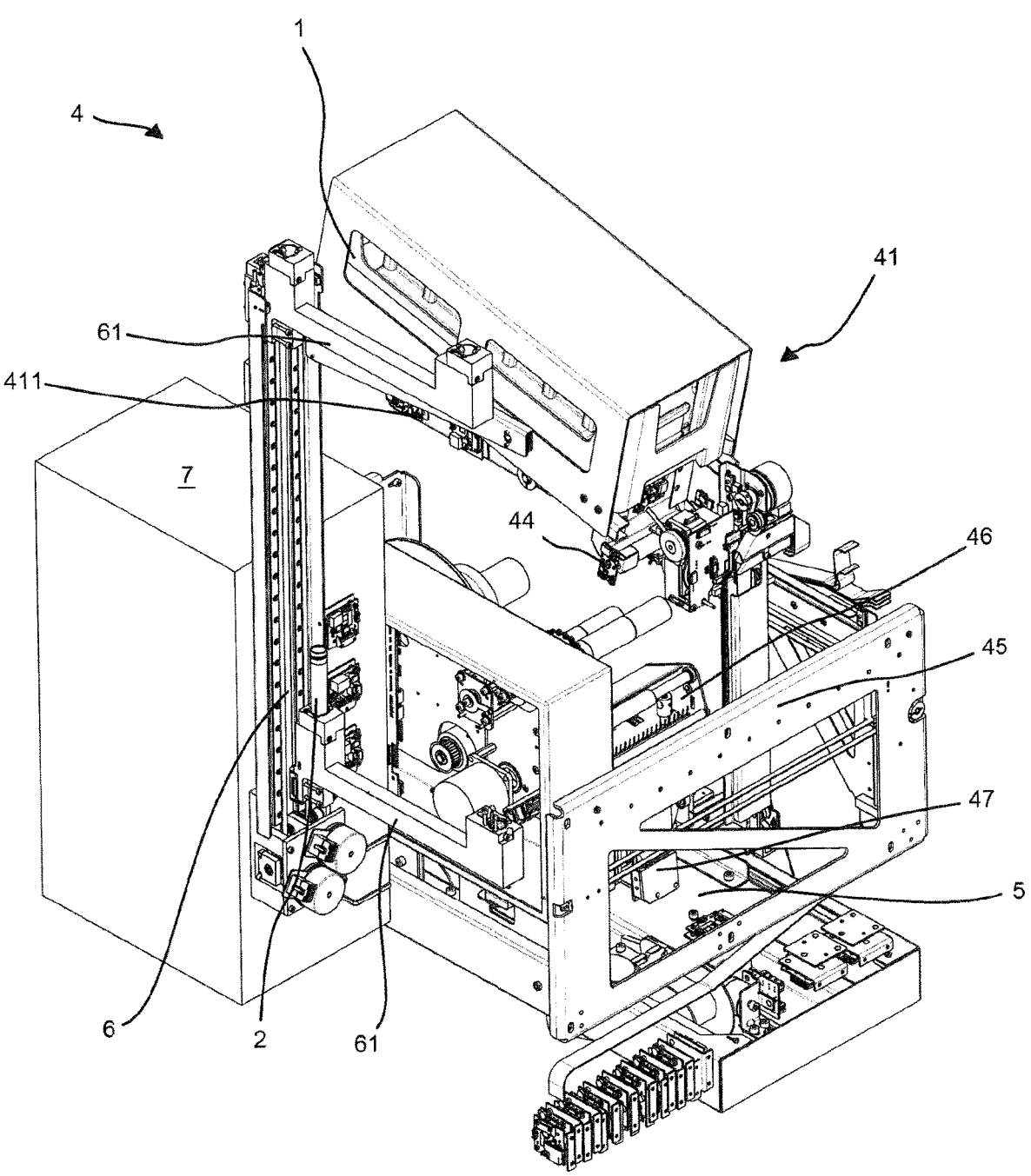
FIG. 7 is a schematic perspective illustration of a secondary tube handling module according to an embodiment of the present invention.

In FIG. 7, the above mentioned secondary tube handling module 4 according to an embodiment of the present invention is shown as schematic illustration in a perspective view, which secondary tube handling module 4 can also be referred to as labeler module or tube barcode labeler due to the fact that a correctly labeled secondary tube 2 is the desired final result of its processing. Now, as can be gathered from FIG. 7, the secondary tube tray 1 has already been loaded into the separator 41 for separation of secondary tubes 2 out of the secondary tube tray 1, for example automatically by means of a tray shuttle or the like, wherein the separator 41 is a component of the secondary tube handling module 4. As can be gathered from FIG. 7, and in comparison to FIG. 8, the separator 41 provides a cover used to prevent secondary tubes 2 from spilling over when the secondary tube tray 1 is tilted. However, in case a user overloads a secondary tube tray 1 with too many secondary tubes 2, the overfilled secondary tubes 2 are removed when loading the secondary tube tray 1 into a loading slot of the automated processing system, for example by means of a barrier or the like. Thus, it can be ensured that no overfilled secondary tube tray 1 is loaded into the separator 41.

Figure 8:
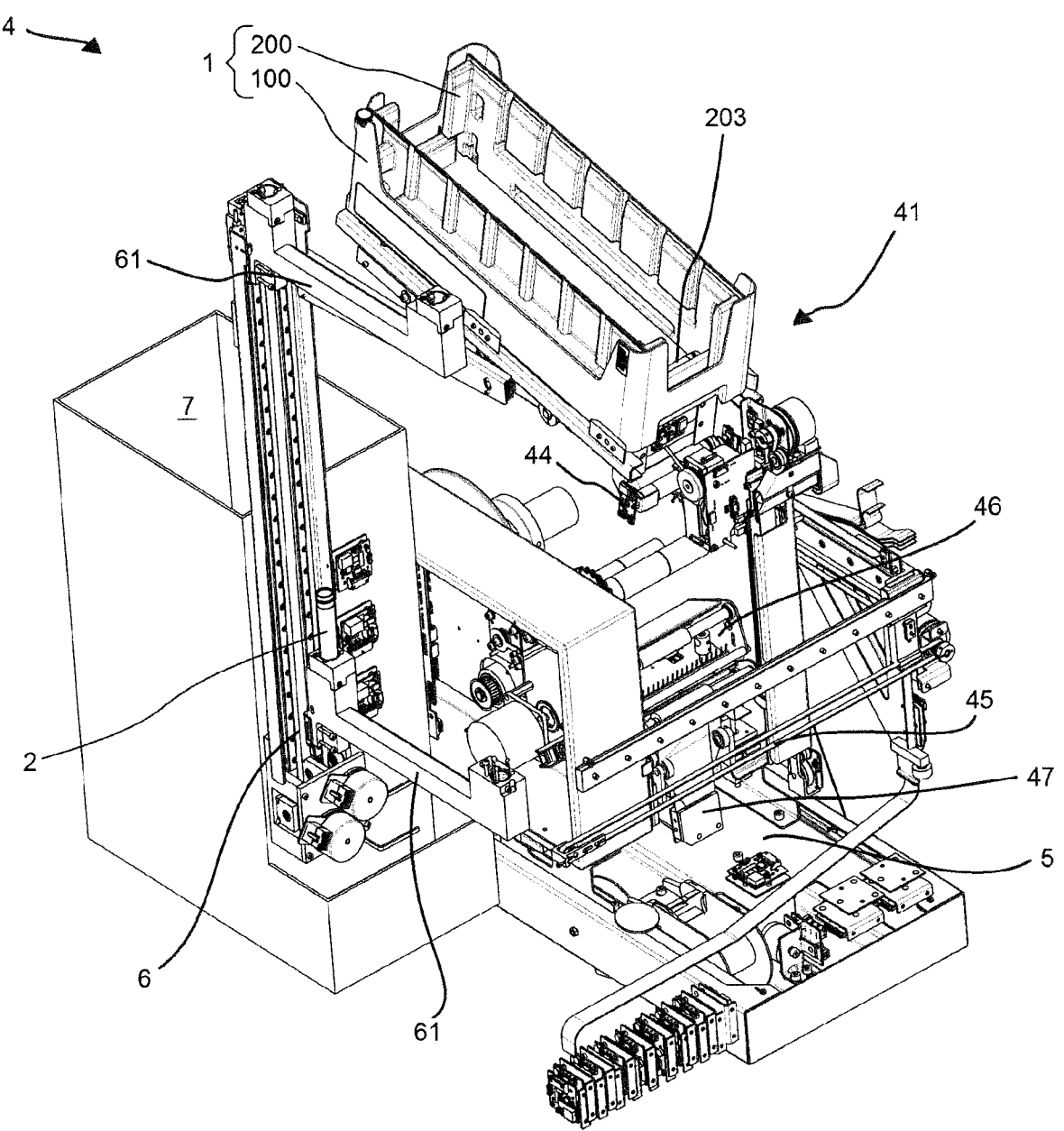
FIG. 8 is a schematic perspective illustration of the secondary tube handling module of FIG. 7 without several component covers for improved perceptibility.

In more detail, the secondary tube tray 1 is loaded into a tray holder of the secondary tube handling module 4, wherein the tray holder in FIGS. 7 and 8 is shown in an already tilted manner, by means of a tilting mechanism 411 for tilting the secondary tube tray 1 about ~12° in regard to its lateral axis, in order to guarantee the progressive feed of secondary tubes 2. For example, the tilting mechanism 411 can be implemented in the form of a combination of a worm gear mechanism and a motor, such as a 1:50 worm gear in combination with a Maxon 5:1 gear on a Maxon EC 45 flat motor. Thereby, the content of the secondary tube tray 1 in the form of stacked secondary tubes (not shown) is continuously forced by means of gravity towards the insert opening 203, which is also derivable from FIG. 8 in which the secondary tube handling module 4 of FIG. 7 is also shown, wherein several covers of different components, such as a cover of the separator 41 has been omitted for better visibility. Accordingly, in FIG. 8, it can be clearly derived that the secondary tube insert 200 together with the base module 100 is tilted by way of the tilting mechanism 411 of the separator 41 about their common lateral axis 412 such that the content of the secondary tube insert 200 in the form of stacked secondary tubes (not shown) are urged towards the insert opening 203. The tilting of a secondary tube tray 1' similar to the previously described secondary tube tray 1 by means of the separator 41 in its so called "transfer position" or "dispensing position" is also described in further detail below with reference to FIGS. 9, 10 and 11, in which a modified secondary tube tray 1' comprising a modified version of a secondary tube insert 200' is shown.

As can be further gathered from FIGS. 7 and 8, the secondary tube handling module 4 also comprises a secondary tube manipulator 45. The secondary tube manipulator 45 serves for handling/transporting the secondary tubes 2 from the separator 41 to a secondary tube feeder 6. In more detail, the tube manipulator 45 transports the secondary tubes 2 out of the secondary tube tray 1 when in transfer position. Accordingly, the separator 41 is used for extracting the secondary tubes 2 out of the secondary tube tray 1 in order to make the secondary tubes 2 accessible to, for example, a gripper of a secondary tube manipulator 45. Here, the separation itself is done by the gripper of the secondary tube manipulator 45 which removes the secondary tubes 2 out of the separator 41 one by one. Here, the secondary tube manipulator 45 functions to transport the separated secondary tubes 2 in front of a label applicator of a tube labeling component 46 for label printing and label application on each secondary tube 2, such as a Rosenbaum barcode labeler RV3, wherein the tube labeling component 46 is positioned on a drawer 5 of the secondary tube handling module 4, the drawer being implemented, for example, by a Hamilton bulk-drawer. Before labeling, a tube orientation sensor 44 will determine the orientation of the separated secondary tube 2, i.e. at which end the open end of the separated secondary tube 2 is located. Here, if necessary, the gripper of the secondary tube manipulator 45 can rotate the separated secondary tube 2 in order to achieve a correct positioning of the secondary tube 2 for labeling. After labeling the secondary tubes 2 according to primary tube information from which the aliquoting is to be done lateron, the tube's ID which has been provided onto the secondary tube 2 by means of the applied label will be checked with a barcode reader 47 used for checking the printed and applied label, wherein the barcode reader 47 is also positioned on the drawer 5. In case the checked secondary tubes 2 are identified to be correctly labeled secondary tubes, the same are put into a tube rack or process rack 61 of the secondary tube feeder 6 and the loaded process rack 61 is moved into a pipetting position for further processing, whereas secondary tubes identified as incorrectly labeled secondary tubes are provided into a solid waste container 7. In FIGS. 7 and 8, the shown secondary tube feeder 6 comprises two process racks 61, which both comprise a general U-shape, and wherein both upper ends of each process rack 61 can receive one correctly labeled secondary tube 2 in an upright position, i.e. each process rack 61 of the secondary tube feeder 6 of the presently described specific embodiment can receive two secondary tubes 2. Here, for the sake of illustration, only one secondary tube 2 is shown, which is received in one end of the lower process rack 61 of the two shown process racks 61, on the left side in FIGS. 7 and 8.

In other words, by means of the secondary tube handling module 4 of the present embodiment, uncapped secondary tubes 2 can be removed from the secondary tube tray 1 and transported in front of the tube labeling component 46. After labeling the secondary tube 2, the barcode printed on the applied label will be checked with the barcode reader 47 before the secondary tube 2 is put into one of the two positions of one of the two process racks 61 of the secondary tube feeder 6. At the end of the transport of the labeled secondary tube 2, the secondary tube feeder 6 moves the process rack 61 which just received the labeled secondary tube 2 up to the pipetting position, for example after the receipt of two labeled secondary tubes 2. Thus, the workflow of the secondary tube handling module 4 can be substantially described with the following simplified listing of process steps/process stations, for example in the listed order:

providing several (e.g. 3) secondary tube trays 1 filled with 170 packed secondary tubes 2, respectively, resulting for each tray in about 5 liter of available secondary tube volume;

separation of secondary tube 2 from the secondary tube tray 1;

rotation of separated secondary tube 2 for label application, if necessary;

label printing and label application onto secondary tube 2, for example by means of label roll transfer band;

checking the secondary tube ID by means of the barcode reader 47;

moving the labeled and checked secondary tube 2 into process rack 61;

moving the rack 61 by means of the secondary tube feeder 6; and pipetting a sample or the like into the separated and labeled secondary tube 2.

Figure 9:
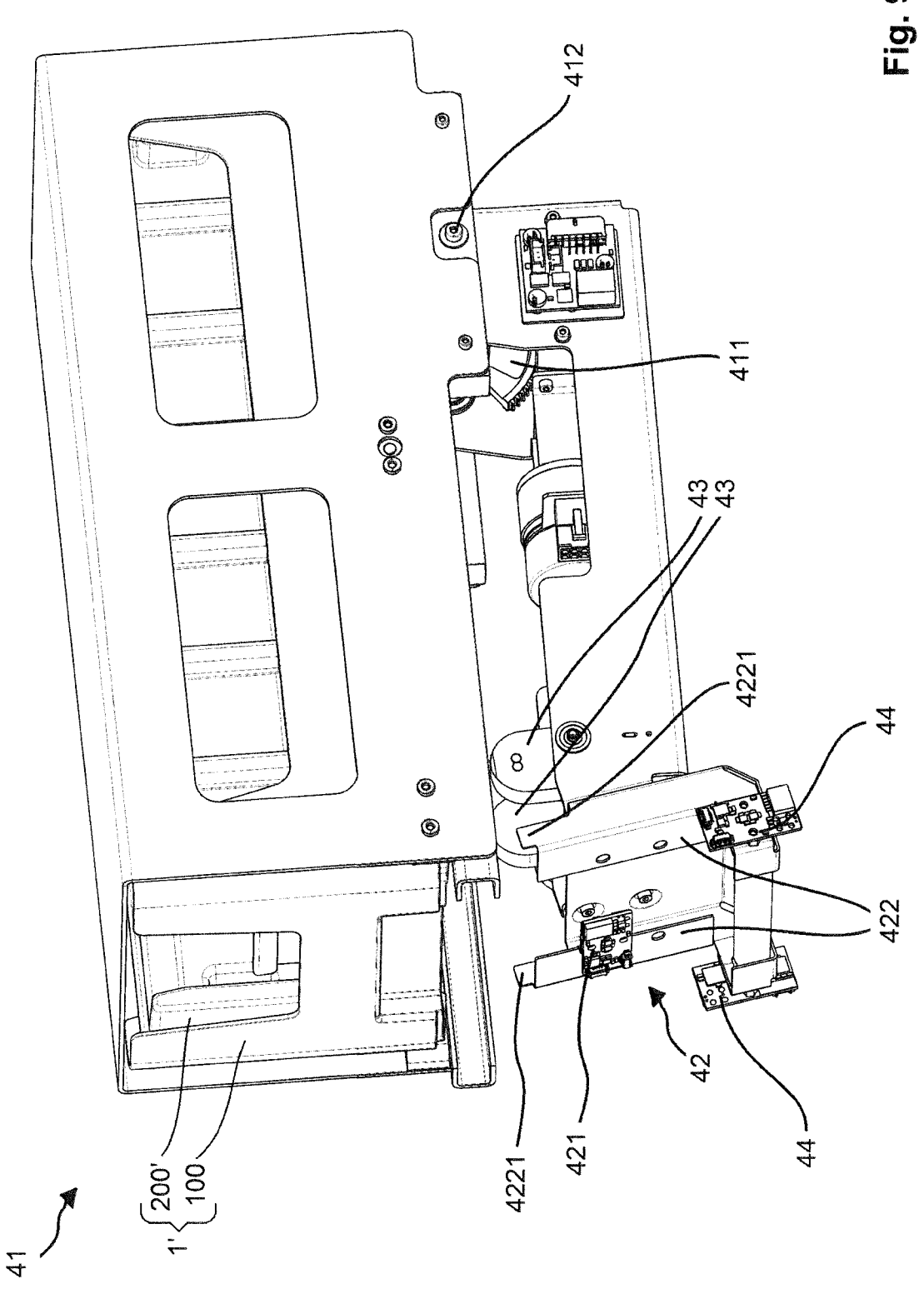
FIG. 9 is an enlarged schematic perspective illustration of the separator of the secondary tube handling module of FIG. 7 including a secondary tube tray according to a further embodiment of the present invention, comprising a modified secondary tube insert.

Regarding the structure of the separator 41, FIG. 9 shows the separator 41 in an enlarged perspective schematic illustration, wherein the separator 41 has been removed from the secondary tube handling module 4 as shown in FIGS. 7 and 8. From FIG. 9, it can be clearly derived that a secondary tube tray 1' according to a slightly modified embodiment is loaded into a tray holder of the secondary tube handling module 4, or better into a tray holder of the separator 41, wherein the tray holder in FIG. 9 provides a cover of the modified secondary tube tray 1', which cover has already been mentioned previously in relation to the secondary tube tray 1. The basic structure of the modified secondary tube tray 1' is basically similar to the previously described embodiment of the secondary tube tray 1, wherein, in the following, similar or identical structural features of the secondary tube tray 1' with the secondary tube tray 1 are not explained in further detail for the sake of avoiding redundancy, and it is focused on the structural differences. Accordingly, a significant difference between the secondary tube tray 1' and the secondary tube tray 1 can be found in that a modified or alternative secondary tube insert 200' is inserted into the base module 100 instead of the previously described secondary tube insert 200. Thus, with particular reference to FIGS. 9, 10 and 11, a modified version of the previously described secondary tube tray 1 is described in the following, which modified secondary tube tray 1' comprises the modified secondary tube insert 200' replacing the previously described secondary tube insert 200. The modified secondary tube insert 200' is substantially similar to the previously described secondary tube insert 200, with the exception that an insert opening 203' in the bottom side 201' of the modified secondary tube insert 200' extends over the entire bottom side 201', resulting in the structural property that the bottom side 201' of the modified secondary tube insert 200' is constituted only by the insert opening 203', i.e. a bottom side 201' of the secondary tube tray 1' is substantially entirely open. Accordingly, the secondary tube insert 200' basically comprises a hollow body with a substantially open bottom side 201', and four closed side walls 202', and with an open upper side, resulting in a rectangular structure of the secondary tube insert 200', wherein the four closed side walls 202' comprise two longitudinal extending side walls and two transversely extending side walls, and wherein the open upper side of the rectangular structure is provided for filling the plurality of secondary tubes 2 into the hollow body of the secondary tube insert 200' when the secondary tube insert 200' has been inserted into the base module 100. After insertion into the base module 100, the open bottom side 201' of the secondary tube insert 200' is basically closed by the bottom side 101 of the base module 100 in the sense of an attached bottom plate, in order for the same to be able to be filled with secondary tubes 2 without the same falling through the insert opening 203' occupying the entire bottom side 201'.

Figure 10:
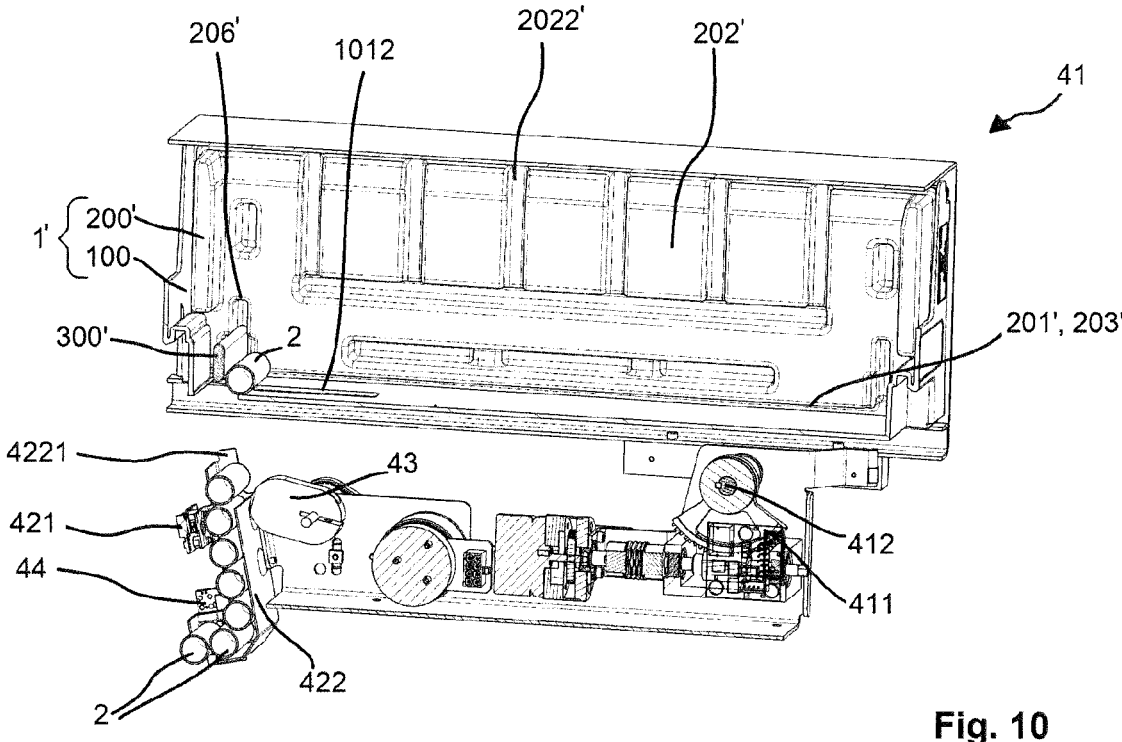
FIGS. 10 & 11 are schematic illustrations of a tilting movement of the separator of FIG. 9 in cross section cut along its middle longitudinal axis, and a respective dispensing action of secondary tubes from the secondary tube tray according to the further embodiment of the present invention, comprising the modified secondary tube insert.
Figure 11:
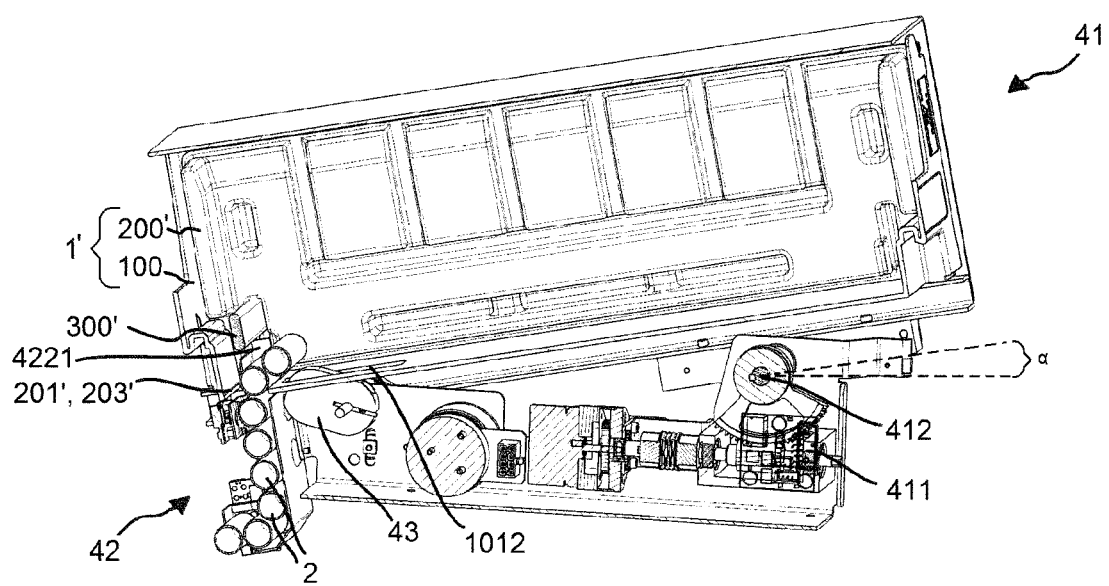

As a further significant difference between the modified secondary tube tray 1' and the secondary tube tray 1, the secondary tube insert 200' of the modified secondary tube tray 1' comprises a different blocking mechanism than the one described above in regard to the secondary tube tray 1. Here, the blocking mechanism in the modified embodiment as depicted in FIGS. 9, 10 and 11 is implemented by means of a blocking bar 300' in the form of a flat latch, which is movably arranged on an inside of the secondary tube insert 200' by means of recesses 206', which recesses 206' are provided on the inside of the secondary tube insert 200' on opposing side walls 202', meaning that the recesses 206' are provided in the inner surface of the inside of the hollow body, preferably in a substantially vertical manner, and extend into the side walls 202'. However, as an alternative, the blocking bar 300' might also be movable in an inclined or sloped manner. The blocking bar 300' is held at its both ends inside the recesses 206' in a movable or slidable manner, with the possibility to move the blocking bar 300' in a substantial vertical or slightly inclined direction upwards and downwards in order to block or unblock the discharge opening 1011, for allowing movement of the blocking bar 300' between its blocking and unblocking position. Here, the blocking mechanism further comprises a biasing spring (not shown), for urging the blocking bar 300' into its blocking position by a biasing force, so that any secondary tube 2 is prevented from passing through the discharge opening 1011 when the blocking bar 300' is in a non-actuated or blocking state, which is a state in which the biasing spring is biasing the blocking bar 300' into its furthest position, i.e. a position in which the blocking bar 300' is as close to the discharge opening 1011 as allowed by the extent of the recesses 206'.

As can be gathered from FIG. 10, the next-to-be-dispensed secondary tube 2 abuts against the blocking bar 300' positioned in its blocking position. When tilting the tray holder by means of the tilting mechanism 411, the blocking mechanism, i.e. the blocking bar 300' is lowered onto blocking mechanism actuating members 4221 (only one is shown in FIGS. 10 and 11 due to simplified illustration) arranged at the respective receiving end of the chute 422 in the form of a spacer. Thereby, the blocking mechanism actuating members 4221 mutually engage and push the blocking bar 300' out of its blocking state and away from the discharge opening 1011 against the biasing force of the biasing spring, and move the blocking bar 300' into its unblocking position, i.e. an actuated or unblocking state of the blocking bar 300', see also FIG. 11, ready for dispensing the secondary tubes 2. Accordingly, a tilting of the tray holder from its initial position to its dispensing position can be gathered from FIG. 10 to FIG. 11, wherein it is clearly shown that the tilting mechanism 411 is implemented by means of a pinion gear mechanism able to move the tray holder and the remaining parts of the separator 41 in relation to each other in the form of a tilting movement about the same axis, i.e. tilting axis 412. In FIG. 11, a tilting angle α of about 12° is also shown. In general, the function of the secondary tube handling module 4 and the function of the other function components as described herein are similar for both described embodiments of the secondary tube tray 1, 1', and the respective descriptions apply for both preferred embodiments as described herein, as well as any described modifications thereof.

In FIG. 9, the tray holder of the separator 41 including the secondary tube tray 1' is shown in a not-tilted manner, also referred to as "loading position" or "initial position", in contrast to the tilted tray holder in its "transfer position" or "dispensing position" as shown in FIGS. 7 and 8. Furthermore, below the insert opening 203' and the discharge opening 1011 (both not shown in FIG. 9 due to angle of illustration) arranged at the left side of the secondary tube tray 1' in FIG. 9, i.e. the discharging side of the secondary tube tray 1', the separator 41 further comprises a buffer intermediate storage 42 for receiving one or multiple discharged or dispensed secondary tubes 2 from the secondary tube tray 1', see also FIGS. 10 and 11. The buffer intermediate storage 42 serves for storing dispensed secondary tubes 2 temporarily, i.e. the buffer intermediate storage 42 is arranged right after the discharge opening 1011 in order to receive the dispensed secondary tubes 2. In order to be able to detect an underrun of a predetermined buffer level, the buffer intermediate storage 42 comprises a buffer level sensor 421 provided on a chute 422 of the buffer intermediate storage 42 in which the dispensed secondary tubes 2 are stacked after being dispensed from the secondary tube tray 1', and the content of which is considered as buffer amount of secondary tubes 2. The buffer intermediate storage 42 of the presently described embodiment also comprises two blocking mechanism actuating members 4221, which are both arranged at the respective receiving end of the chute 422, and which are both implemented in the form of a spacer, i.e. a flat elongated pin. Now, in order to be able to actuate the blocking mechanism and cause the secondary tubes 2 from the secondary tube tray 1, 1' to be dispensed into the buffer intermediate storage 42 after exiting the insert opening 203, 203' and the discharge opening 1011, each blocking mechanism actuating member 4221 must engage and push the blocking mechanism away from the discharge opening 1011 and, if necessary, from the insert opening 203, 203'. As an example with view on the blocking mechanism as shown in FIGS. 5 and 6, each blocking mechanism actuating member 4221 pushes the hatch member 300 against the biasing force of the biasing spring and moves or pivots the hatch member 300 into an open position, see also FIG. 6, thereby moving the hatch member 300 from a closed or blocking position into an open or unblocking position, ready for dispensing the secondary tubes 2. This can be achieved by tilting the secondary tube tray 1 by means of the separator 41 in its "transfer position" or "dispensing position" and, thus, by moving the blocking mechanism actuating members 4221 through the insert opening 203 and the discharge opening 1011 for engagement with the hatch member 300, in order to push the same upwards. Thus, it can be ensured that the discharge opening 1011 is only entirely opened in the tilted position, and the secondary tubes 2 fall directly into the chute 422 of the buffer intermediate storage 42. In this regard, a critical situation can arise right when the secondary tube tray 1 is lifted due to any reason before it is completely empty. Here, the secondary tube tray 1 and the buffer intermediate storage 42 have to be adjusted very precisely so that the hatch member 300 closes before the subsequent secondary tube 2 can pass through the discharge opening 1011. This is necessary due to the fact that such a subsequent secondary tube 2, when passing through, can fall down to the ground of the automated processing system from where it has to be removed by a technician during maintenance service.

As a particular embodiment of the buffer intermediate storage 42, the chute 422 of the buffer intermediate storage 42 can receive up to five (5) secondary tubes 2, and the buffer level sensor 421 is arranged above a certain height of the chute 422, which height can, for example, correspond to four secondary tubes 2, such that the buffer level or buffer filling level is about four secondary tubes 2, meaning that the buffer level sensor 421 can detect when the buffer level is lower than four secondary tubes 2. This means that four (4) secondary tubes 2 are remaining in the buffer intermediate storage 42 at the time when the buffer level sensor 421 emits a sensor signal indicating that the presently used secondary tube tray 1' is most likely empty. As can be gathered exemplary from FIG. 11, each cam member 43 can reach or pass through the respective actuation opening 1012 and into the inside of the secondary tube insert 200, 200' from the outside in order to push or shuffle the stacked secondary tubes 2 towards the insert opening 203, 203', wherein each cam member 43 is used as actuation member and is implemented by means of an eccenter wheel connected to a respective drive mechanism. If the state persists that a sensor signal indicating that the presently used secondary tube tray 1' is most likely empty is emitted, despite an operation of cam members 43, it is assumed that the presently used secondary tube tray 1' is empty and needs to be exchanged by means of the tray shuttle (not shown). The cam members 43 can also be used to dissolve any blockings of secondary tubes 2 in front of the discharge opening 1011, since the cam members 43, respectively, give additional movement into the stack of secondary tubes 2. In the buffer intermediate storage 42, a content of four secondary tubes 2 can be equivalent to about 80 seconds for the tray shuttle to replace the empty secondary tube tray 1' with a new secondary tube tray 1, 1' filled with secondary tubes 2. Regarding the structural features of the buffer level sensor 421, the same can be implemented by means of a Time-of-Flight (ToF) sensor or the like, for detecting an underrun of the predetermined buffer level of the number of received discharged secondary tubes 2.

By actuating the blocking mechanisms as previously described, the secondary tubes 2 are caused to be dispensed from the secondary tube tray 1, 1' into the chute 422 of the buffer intermediate storage 42 after exiting the insert opening 203, 203' and the discharge opening 1011. Thus, it can be ensured that the discharge opening 1011 is only open in the tilted position of the tray holder, and the secondary tubes 2 fall direct into the chute 422 of the buffer intermediate storage 42. In FIG. 11, the secondary tube 2 on the lower left side, i.e. the first one to exit the chute 422 and, thus, the buffer intermediate storage 42, is the next secondary tube 2 made accessible to the gripper (not shown) of the secondary tube manipulator 45 for separation, wherein the gripper removes the secondary tube 2 out of the separator 41 and transports the separated secondary tube 2 in front of a label applicator of the tube labeling component 46 for label printing and label application on the separated secondary tube 2. Here, the buffer level sensor 421 provided on the chute 422 of the buffer intermediate storage 42 is also shown in FIGS. 10 and 11, wherein the chute 422 of the buffer intermediate storage 42 of the presently described modified embodiment can receive up to six (6) secondary tubes 2, and the buffer level sensor 421 is arranged above a certain height of the chute 422, which height corresponds to about five (5) secondary tubes 2, such that the buffer level or buffer filling level is to be found at about five (5) secondary tubes 2, meaning that the buffer level sensor 421 can detect when the buffer level is lower than five (5) secondary tubes 2.

Furthermore, as can also be gathered from FIG. 11, the secondary tube 2 to exit the chute 422 next is provided directly at the tube orientation sensor 44, or better between two tube orientation sensors 44 at the end of the chute 422, such that the secondary tube 2 that is next to being gripped by the gripper of the secondary tube manipulator 45 can be checked in regard to its orientation, in order to determine if it is necessary to rotate the secondary tube 2 for labeling. In the presently described embodiment, the chute 422 is equipped with the two tube orientation sensors 44 in a spaced apart manner in order to be able to receive the next-to-be-dispensed secondary tube 2 therein between, which sensors 44 are implemented, for example, in the form of two Time-of-Flight (ToF) sensors or the like.

Figure 12:
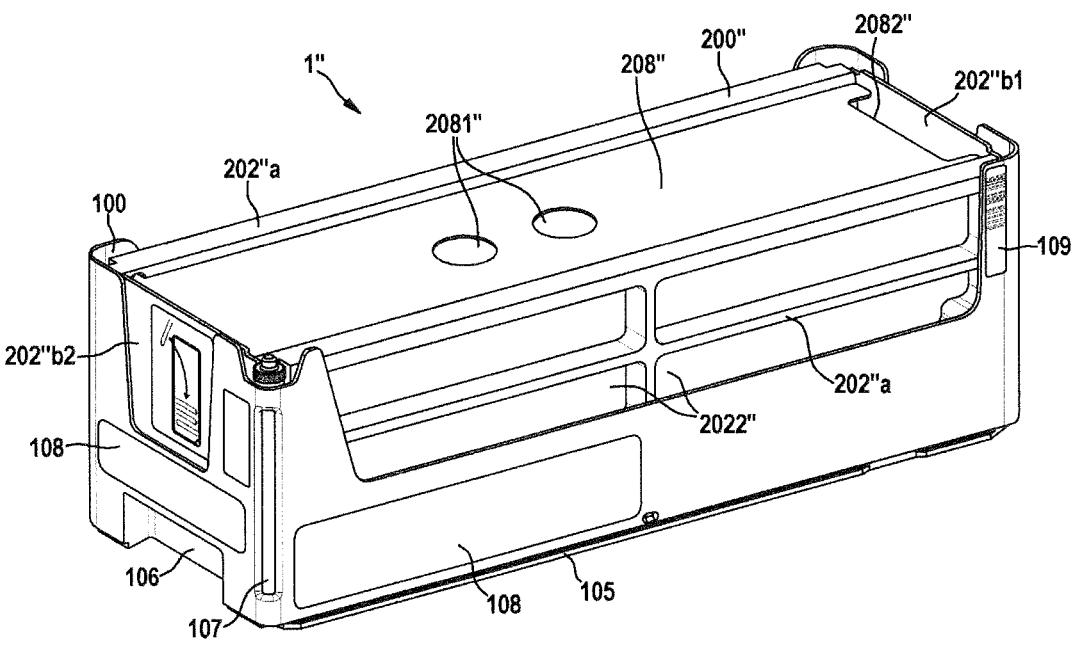
FIG. 12 is a schematic perspective illustration of a secondary tube tray according to a further embodiment of the present invention, consisting of a base module and a secondary tube insert inserted therein, with a cover plate in the form of a lid closing the secondary tube insert.
Figure 13:
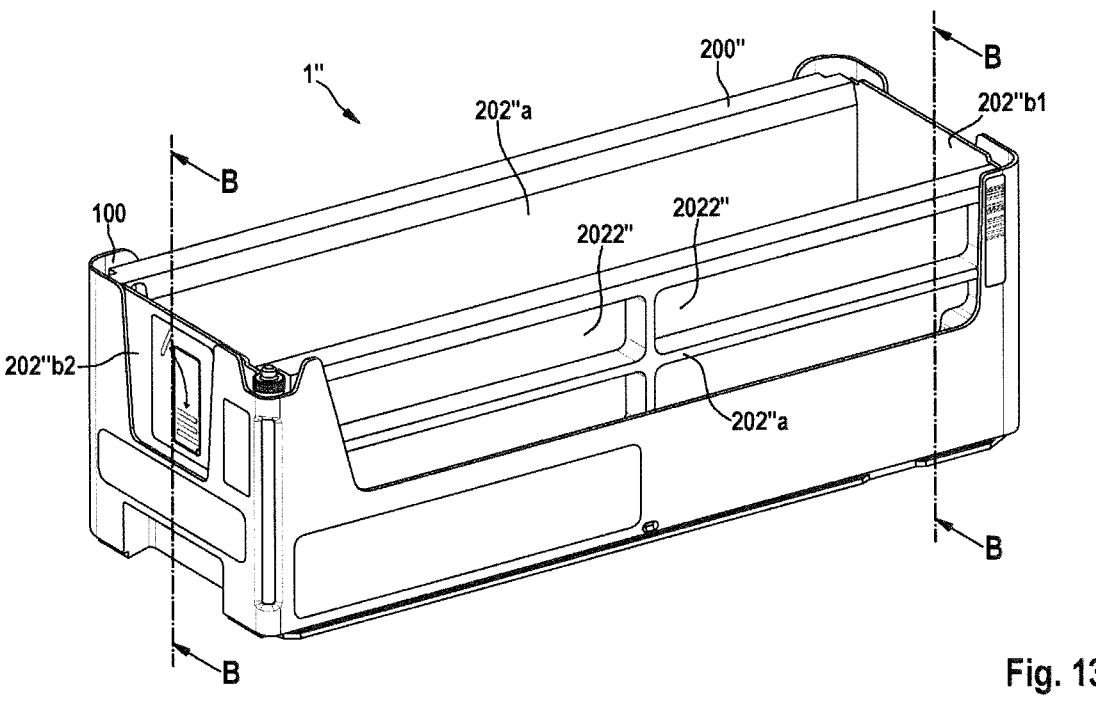
FIG. 13 is a schematic perspective illustration of the secondary tube tray as shown in FIG. 12 without the cover plate.
Figure 14:
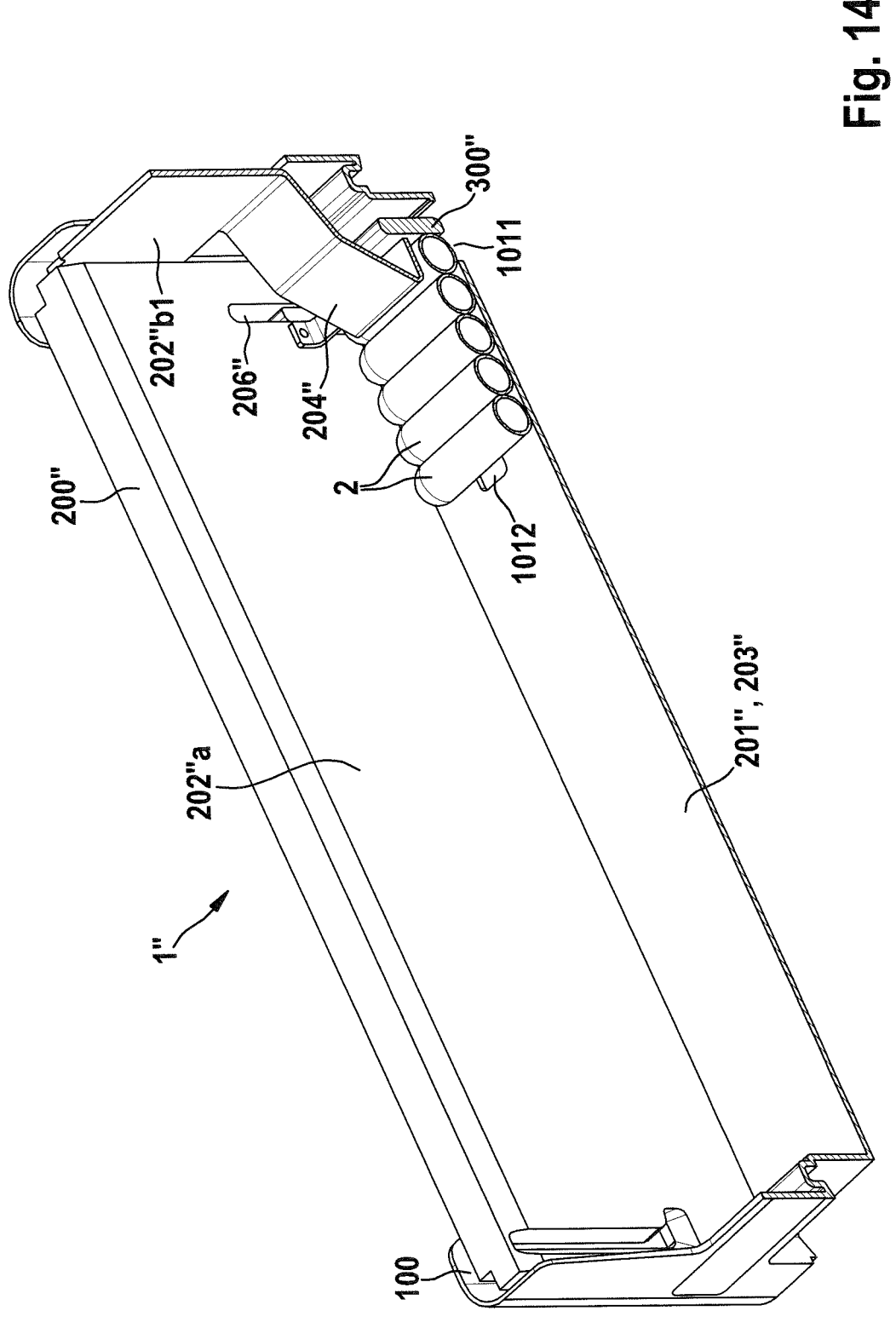
FIG. 14 is a schematic perspective illustration of the secondary tube tray as shown in FIG. 13 cut along the plane B-B, and filled with five secondary tubes lined up before the discharge opening.

In FIGS. 12, 13 and 14, a further modified embodiment of a secondary tube tray is depicted in the form of secondary tube tray 1". From FIG. 12, it can be clearly derived that the secondary tube tray 1" according to the further modified embodiment has a basic structure which is substantially similar to the previously described embodiments of the secondary tube tray 1 and 1', wherein, in the following, similar or identical structural features of the secondary tube tray 1" with the secondary tube tray 1 or 1' are not explained in further detail for the sake of avoiding redundancy, and it is focused on the structural differences. Accordingly, a significant difference between the secondary tube tray 1" and the previously described secondary tube trays 1 and 1' can be found in that an alternative secondary tube insert 200" is inserted into the base module 100, instead of the previously described embodiments of secondary tube inserts 200 and 200'. Thus, with particular reference to FIGS. 12, 13 and 14, the thus modified version of the previously described secondary tube trays 1 and 1' is described in the following, which further modified secondary tube tray 1" comprises the modified secondary tube insert 200". The further modified secondary tube insert 200" is substantially similar to the previously described modified secondary tube insert 200', with the exception that the rectangular block shape of the secondary tube insert 200" now consists of two longitudinal side plates or longitudinal side walls 202"a, a transversely extending first cross side plate or cross side wall 202"b1 and a transversely extending second cross side plate or cross side wall 202"b2, with the longitudinal side walls 202"a constituting the long sides of the further modified secondary tube insert 200", with the first cross side wall 202"b1 constituting the short side of the further modified secondary tube insert 200" at the side of the discharge opening 1011 of the base module 100, and with the second cross side wall 202"b2 constituting the short side of the further modified secondary tube insert 200" at the side of the rotatable color indicator 107 of the base module 100.

Whereas the longitudinal side walls 202"a are made of polypropylene (PP) or polycarbonate blends, such as polycarbonate with styrene acrylonitrile (PC/SAN) and polycarbonate with acrylonitrile-butadiene-styrene (PC/ABS), as described before, both cross side walls 202"b1 and 202"b2 can be made of metal plates connected to end sides of the longitudinal side walls 202"a, for example by means of a screw-connection or the like. Thereby, the cross side walls 202"b1 and 202"b2 can be made significantly thinner than the side walls before, resulting in an enlarged inner space of the further modified secondary tube insert 200". Moreover, as can be gathered from FIG. 14, the cross side wall 202"b1 extends towards the open bottom side 201" of the further modified secondary tube insert 200" by protruding into the inner space of the further modified secondary tube insert 200". Thereby, the lower part of the cross side wall 202"b1 constitutes a separating element 204" for singularizing the secondary tubes 2 towards the discharge opening 1011 of the base module 100, such that the secondary tubes 2 one-by-one reach the discharge opening 1011. The thus formed separating element 204" can be additionally secured to the inner side of the longitudinal side walls 202"a, for example by means of a screw-connection or the like, in order to provide additional stability. The general structure of the separating element 204" as part of the cross side wall 202"b1 is similar to the recess structure of recess 204 of the secondary tube insert 200 as shown in FIGS. 5 and 6. As can also be gathered from FIG. 14, the secondary tube insert 200" of the further modified secondary tube tray 1" comprises a blocking mechanism similar to the one described above in regard to the modified secondary tube tray 1'. Here again, the blocking mechanism as implemented by means of a blocking bar 300" in the form of a flat latch, which is movably arranged on an inside of the secondary tube insert 200" by means of recesses 206", which recesses 206" are provided on the inside of the secondary tube insert 200" on opposing longitudinal side walls 202"a, meaning that the recesses 206" are provided in the inner surface of the inside of the hollow body, preferably in a substantially vertical manner, and extend into the longitudinal side walls 202"a. The blocking bar 300" is held at its both ends inside the recesses 206" in a movable or slidable manner, with the possibility to move the blocking bar 300" in a substantially vertical or slightly inclined direction upwards and downwards in order to block or unblock the discharge opening 1011, for allowing movement of the blocking bar 300" between its blocking and unblocking position. The separating element 204" is bulged inwards in such a way that a movement of the blocking bar 300" is not hindered in any way. For the movability of the blocking bar 300", the blocking mechanism again further comprises a biasing spring (not shown), for urging the blocking bar 300" into its blocking position by a biasing force, so that any secondary tube 2 is prevented from passing through the discharge opening 1011 when the blocking bar 300" is in a non-actuated or blocking state, which is a state in which the biasing spring is biasing the blocking bar 300" into its furthest position, i.e. a position in which the blocking bar 300" is as close to the discharge opening 1011 as allowed by the extent of the recesses 206".

As can be gathered from FIG. 12 or FIG. 13, the cross side wall 202"b1 does not provide any extension towards the inner side of the secondary tube insert 200", thus, constituting a simple flat side wall, wherein the outer side of the cross side wall 202"b1 can be used as base for a label 207 giving, for example, information about the content of the further modified secondary tube insert 200", or giving instructions as to handle the further modified secondary tube insert 200" or its content. As a specific example as depicted in FIGS. 12 and 14, the label 207 can give instructions for how to arrange the secondary tubes 2 within the further modified secondary tube insert 200", in the sense of their axial orientation or horizontal orientation of one secondary tube 2 to another, meaning that the horizontally received secondary tubes 2 can be randomly arranged in regard to their longitudinal axis, i.e. the open top of one secondary tube 2 can be arranged next to the bottom of an adjacent secondary tube 2, or the other way around, thereby simplifying filling of the further modified secondary tube tray 1".

Accordingly, the further modified secondary tube insert 200" basically comprises a hollow body with a substantially open bottom side 201", and four closed side walls 202"*a*, 202"*b*1 and 202"*b*2, and with an open upper side, resulting in a rectangular structure of the secondary tube insert 200". After insertion into the base module 100, the open bottom side 201" of the further modified secondary tube insert 200" is basically closed by the bottom side 101 of the base module 100 in the sense of an attached bottom plate, in order for the same to be able to be filled with secondary tubes 2. Now, as can be gathered in particular from FIG. 12, a cover plate 208 is arranged on the open upper side of the secondary tube insert 200", which cover plate 208" is similar to the cover provided by the separator 41 as described above, used to prevent secondary tubes 2 from spilling over when the secondary tube tray 1" is tilted. In further detail, the cover plate 208 is removably attached within an upper portion of the secondary tube insert 200" in order to securely close the open upper side of the secondary tube insert 200", wherein the removable cover plate 208" can also be used to put pressure on the stack of secondary tubes 2 within the secondary tube insert 200" so that the secondary tubes 2 can be pushed towards or even out of the discharge opening 1011 in the bottom side of the base module 100 in case of an open blocking bar 300". For better handleability, the cover plate 208" can comprise two through holes 2081" arranged next to each other, in order to make it easier for an operator to grasp the cover plate 208" with his/her fingers and to lift the cover plate 208" off the secondary tube insert 200", for example when filling the secondary tube tray 1" with secondary tubes 2. Additionally, the cover plate 208" can comprise a slot 2082", for example used for tube fill level detection by a camera or the like.

As a further significant difference between the modified secondary tube tray 1' and the further modified secondary tube tray 1", each of the opposing longitudinal side walls 202"*a* of the further modified secondary tube insert 200" comprises basically cube-shaped indentations 2022" on its outside directed towards the inside of the secondary tube insert 200", i.e. away from the inner surface of the respective longitudinal side walls 102 of the base module 100, which can also function as reinforcement features for increasing the stability of the secondary tube insert 200" and, thus, the secondary tube tray 1". Accordingly, the inner space of the further modified secondary tube insert 200" provides a smooth surface, with the indentations 2022" provided on its outside. With such structure of indentations 2022" on its outside, the secondary tube insert 200" and, thus, the secondary tube tray 1" achieves a lightweight but stable structure.

While the current invention has been described in relation to its specific embodiments, it is to be understood that this description is for illustrative purposes only. Accordingly, it is intended that the invention be limited only by the scope of the claims appended hereto.

This application claims priority of European patent application EP 18 153 040.3, the subject-matters of which are listed below for the sake of completeness:

Item 1. A secondary tube tray for an automated processing system, the secondary tube tray comprising a base module and a secondary tube insert adapted for holding a plurality of secondary tubes in parallel, the secondary tube insert being inserted into said base module, wherein the base module comprises a substantially closed bottom side with at least one discharge opening for discharging secondary tubes, the secondary tube insert is a hollow body with at least one insert opening in its bottom side;

the secondary tube insert or the base module comprises a blocking mechanism, said blocking mechanism blocking the discharge opening in the bottom side of the base module when not operated, wherein the blocking mechanism is adapted to be openable from the outside.

Item 2. The secondary tube tray according to item 1, wherein the discharge opening allows discharging of at least one secondary tube in an open state of the blocking mechanism.

Item 3. The secondary tube tray according to item 1 or 2, wherein the insert opening in the bottom side of the secondary tube insert allows passage of a blocking mechanism actuating member from the outside through the bottom side of the base module to the blocking mechanism, preferably wherein the bottom side of the base module further comprises at least one actuation opening for allowing passage of said blocking mechanism actuating member from the outside through the bottom side of the secondary tube insert to the blocking mechanism.

Item 4. The secondary tube tray according to item 3, wherein the actuation opening is provided next to the discharge opening in the bottom side of the base module, preferably wherein said actuation opening in the bottom side of the base module is covered by said insert opening in the bottom side of the secondary tube insert.

Item 5. The secondary tube tray according to any one of the preceding items, wherein the secondary tube insert comprises the blocking mechanism in the form of a blocking bar movably arranged on an inside of the secondary tube insert, preferably wherein the blocking bar is arranged in a recess in a side wall of the hollow body of the secondary tube insert for allowing movement of the blocking bar between its blocking and unblocking position, further preferably wherein the blocking bar is urged into its blocking position by a biasing force.

Item 6. The secondary tube tray according to any one of the preceding items, wherein the insert opening in the bottom side of the secondary tube insert is at least of the same dimension as the discharge opening in the bottom side of the base module, preferably wherein the insert opening in the bottom side of the secondary tube insert substantially extends over the entire surface area of the bottom side of the secondary tube insert.

Item 7. The secondary tube tray according to any one of the preceding items, wherein the insert opening in the bottom side of the secondary tube insert and the discharge opening in the bottom side of the base module provide a through-hole between the inside and the outside of the secondary tube tray, preferably wherein the insert opening in the bottom side of the secondary tube insert) and the discharge opening in the bottom side of the base module are at least dimensioned for passage of a single secondary tube, further preferably wherein the insert opening in the bottom side of the secondary tube insert and the discharge opening in the bottom side of the base module are broader than an longitudinal length of each secondary tube.

Item 8. The secondary tube tray according to any one of the preceding items, wherein the secondary tube insert is at least partially enclosed by the base module in a framed manner, without the secondary tube insert protruding to the outside of the base module, and preferably wherein the base module is adapted to be stackable on top of another base module of the same type.

Item 9. The secondary tube tray according to according to any one of the preceding items, wherein the secondary tube insert accommodates secondary tubes in their horizontal position, preferably wherein the secondary tubes can be randomly oriented inside the secondary tube insert in a horizontally aligned manner.

Item 10. The secondary tube tray according to according to any one of the preceding items, wherein the blocking mechanism and the discharge opening in the bottom side of the base module are adapted for dispensing the secondary tubes one-by-one.

Item 11. A secondary tube handling module of an automated processing system for automatically processing biological sample, preferably provided as a component arranged inside a housing of the automated processing system, wherein the secondary tube handling module is adapted to hold at least one secondary tube tray according to any one of the preceding items;

the secondary tube handling module comprises a separator for extraction of secondary tubes from the secondary tube insert of the secondary tube tray, the separator comprising a tilting mechanism for tilting the secondary tube tray about a lateral axis, preferably between 10° and 14°, further preferably 12° about the lateral axis;

the secondary tube handling module comprises at least one blocking mechanism actuating member for actuating the blocking mechanism to block/unblock the discharge opening in the bottom side of the base module, preferably in the form of a pin or a spacer; and the secondary tube tray and said blocking mechanism actuating member are movable relative to each other by means of said tilting mechanism to move the blocking mechanism actuating member through the discharge opening in the bottom side of the base module and through the insert opening in the bottom side of the secondary tube insert, to engage with the blocking mechanism.

Item 12. The secondary tube handling module according to item 11, further comprising at least one cam member for pushing subsequent secondary tubes towards the discharge opening of the secondary tube tray by movement of the cam member through the actuation opening of the base module and the insert opening of the secondary tube insert, preferably wherein the cam member is adapted to push subsequent secondary tubes towards the discharge opening only when the insert opening is unblocked, further preferably wherein the cam member is an eccentric disk.

Item 13. The secondary tube handling module according to item 11 or 12, further comprising a buffer intermediate storage for receiving multiple discharged secondary tubes and storing the same temporarily, the buffer intermediate storage comprising the blocking mechanism actuating member at its receiving end.

Item 14. The secondary tube handling module according to item 13, wherein the buffer intermediate storage is used for determining a number of received discharged secondary tubes, preferably wherein the buffer intermediate storage comprises at least one buffer sensor for detecting an underrun of a predetermined buffer level of the number of received discharged secondary tubes, further preferably wherein the buffer intermediate storage is adapted to receive a maximum of five secondary tubes, and wherein the predetermined buffer level is predetermined to be four secondary tubes.

Item 15. A method of handling secondary tubes for use in automatically processing biological sample in an automated processing system, by means of the secondary tube handling module according to any one of items 11 to 14, the method comprising the steps of:

receiving the secondary tube tray according to any one of items 1 to 10 by means of the secondary tube handling module;

tilting the secondary tube tray about its lateral axis by means of the tilting mechanism;

actuating the blocking mechanism of the secondary tube tray by means of the blocking mechanism actuating member to unblock the discharge opening in the bottom side of the base module, and, if necessary, actuating the cam member for pushing secondary tubes towards the discharge opening of the secondary tube tray, resulting in the buffer intermediate storage receiving discharged secondary tubes; and extracting a secondary tube from the discharging end of the buffer intermediate storage by means of the separator of the secondary tube handling module.

The invention claimed is:

1. A secondary tube handling module for an automated processing system for automatically processing a biological sample, provided as a component arranged inside a housing of the automated processing system, wherein:

the secondary tube handling module is adapted to hold at least one secondary tube tray comprising a base module and a secondary tube insert, the secondary tube insert being adapted for holding a plurality of secondary tubes in parallel, the secondary tube insert being inserted into said base module, wherein the base module comprises a substantially closed bottom side with at least one discharge opening for discharging secondary tubes, the secondary tube insert is a hollow body with at least one insert opening in its bottom side, and the secondary tube insert comprises a blocking mechanism in the form of a blocking bar movably arranged on an inside of the secondary tube insert, said blocking mechanism blocking the at least one discharge opening in the bottom side of the base module when the blocking mechanism is not moved from a closed state to an open state, wherein the blocking mechanism is adapted to be openable from outside of the base module;

the secondary tube handling module comprises a separator for extraction of secondary tubes from the secondary tube insert of the secondary tube tray, the separator comprising a tilting mechanism for tilting the secondary tube tray about a lateral axis;

the secondary tube handling module comprises at least one blocking mechanism actuating member for actuating the blocking mechanism to block/unblock the discharge opening in the bottom side of the base module; and the secondary tube tray and said blocking mechanism actuating member are movable relative to each other by means of said tilting mechanism to move the blocking mechanism actuating member through the discharge opening in the bottom side of the base module and through the insert opening in the bottom side of the secondary tube insert, to engage with the blocking mechanism.

2. The secondary tube handling module according to claim 1, further comprising at least one cam member for pushing subsequent secondary tubes towards the discharge opening of the secondary tube tray by movement of the cam member through the actuation opening of the base module and the insert opening of the secondary tube insert.

3. The secondary tube handling module according to claim 1, further comprising a buffer intermediate storage for receiving multiple discharged secondary tubes and storing the same temporarily, the buffer intermediate storage comprising the blocking mechanism actuating member at its receiving end.

4. The secondary tube handling module according to claim 3, wherein the buffer intermediate storage is adapted for determining a number of received discharged secondary tubes, wherein the buffer intermediate storage comprises at least one buffer sensor for detecting an underrun of a predetermined buffer level of the number of received discharged secondary tubes.

5. The secondary tube handling module according to claim 2, wherein the cam member is adapted to push subsequent secondary tubes towards the discharge opening only when the insert opening is unblocked.

6. The secondary tube handling module according to claim 2, wherein the cam member is an eccentric disk.

7. The secondary tube handling module according to claim 4, wherein the buffer intermediate storage is adapted to receive a maximum of five secondary tubes, and wherein the predetermined buffer level is predetermined to be four secondary tubes.

8. The secondary tube handling module according to claim 1, wherein the tilting mechanism is configured to tilt the secondary tube tray between 10° and 14° about the lateral axis.

9. The secondary tube handling module according to claim 1, wherein the tilting mechanism is configured to tilt the secondary tube tray 12° about the lateral axis.

10. The secondary tube handling module according to claim 1, wherein the blocking mechanism actuating member comprises at least one of a pin and a spacer.

* * * * *